US011481111B2

(12) United States Patent
Roedel et al.

(10) Patent No.: US 11,481,111 B2
(45) Date of Patent: Oct. 25, 2022

(54) UTILIZATION OF PREDICTIVE GESTURE ANALYSIS FOR PRELOADING AND EXECUTING APPLICATION COMPONENTS

(71) Applicant: MICROSOFT TECHNOLOGY LICENSING, LLC, Redmond, WA (US)

(72) Inventors: Dominic Roedel, Prague (CZ); Anastasiya Sarmant, Prague (CZ); Mario Novoselec, Prague (CZ)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/858,541

(22) Filed: Apr. 24, 2020

(65) Prior Publication Data
US 2021/0333987 A1 Oct. 28, 2021

(51) Int. Cl.
*G06F 3/04883* (2022.01)
*G06F 3/0482* (2013.01)
(Continued)

(52) U.S. Cl.
CPC ........ *G06F 3/04883* (2013.01); *G06F 3/0482* (2013.01); *G06F 9/4843* (2013.01); *G06F 11/302* (2013.01); *G06F 11/3438* (2013.01)

(58) Field of Classification Search
CPC .. G06F 3/04883; G06F 3/0482; G06F 9/4843; G06F 11/302; G06F 11/3438
See application file for complete search history.

(56) References Cited

U.S. PATENT DOCUMENTS 6,025,871 A 2/2000 Kantor et al.
6,182,133 B1 1/2001 Horvitz
(Continued)

FOREIGN PATENT DOCUMENTS

WO 2010001326 A1 1/2010

OTHER PUBLICATIONS

"International Search Report and Written Opinion Issued in PCT Application No. PCT/US21/018437", dated Jun. 4, 2021, 12 Pages.

*Primary Examiner* — Sherrod L Keaton
(74) *Attorney, Agent, or Firm* — Scott Y. Shigeta; Newport IP, LLC

(57) ABSTRACT

The techniques disclosed herein utilize predictive gestures to preload and/or execute application components to provide improved responsiveness and loading times in software applications. In some configurations, a system can monitor user input gestures to determine if a user-controlled cursor moves into a detection area positioned in proximity to one or more selectable user interface ("UI") elements. When a user input causes a cursor to move into the detection area, a computing device can preload or execute one or more application components in memory. The system can also dynamically adjust the position, size and/or shape of the detection area based on a number of factors, including the recognition of one or more predetermined input gestures. By dynamically adjusting a detection area, the system can optimize the predictive techniques for identifying the intent of a user for initiating preload or pre-execution operations for one or more application components.

17 Claims, 26 Drawing Sheets

(51) Int. Cl.
   *G06F 9/48* (2006.01)
   *G06F 11/30* (2006.01)
   *G06F 11/34* (2006.01)

(56) References Cited

U.S. PATENT DOCUMENTS

| | | | |
|---|---|---|---|
| 7,616,191 B2* | 11/2009 | Matta | G06F 1/1626 |
| | | | 345/168 |
| 7,688,967 B2 | 3/2010 | Patel et al. | |
| 8,334,842 B2 | 12/2012 | Markovic et al. | |
| 8,706,750 B2 | 4/2014 | Hansson et al. | |
| 9,318,129 B2 | 4/2016 | Vasilieff et al. | |
| 9,769,030 B1* | 9/2017 | Ramalingam | H04L 67/5681 |
| 9,886,177 B2 | 2/2018 | Lee et al. | |
| 10,356,200 B2 | 7/2019 | Zhang et al. | |
| 2009/0075633 A1 | 3/2009 | Lee et al. | |
| 2010/0003652 A1 | 1/2010 | Lavie et al. | |
| 2011/0187654 A1 | 8/2011 | Lin | |
| 2012/0019472 A1* | 1/2012 | Tomita | A63F 13/426 |
| | | | 345/173 |
| 2013/0086490 A1* | 4/2013 | Roskind | G06F 3/0488 |
| | | | 715/760 |
| 2014/0033095 A1* | 1/2014 | Koba | G06F 3/0488 |
| | | | 715/765 |
| 2015/0277710 A1 | 10/2015 | Lee et al. | |
| 2016/0188542 A1 | 6/2016 | Burkard et al. | |
| 2016/0239468 A1 | 8/2016 | Capt et al. | |
| 2016/0256784 A1 | 9/2016 | Schultz et al. | |
| 2017/0090585 A1* | 3/2017 | Bernhart | G06F 3/0485 |
| 2017/0364198 A1 | 12/2017 | Yoganandan et al. | |
| 2019/0065034 A1 | 2/2019 | Choi et al. | |

\* cited by examiner

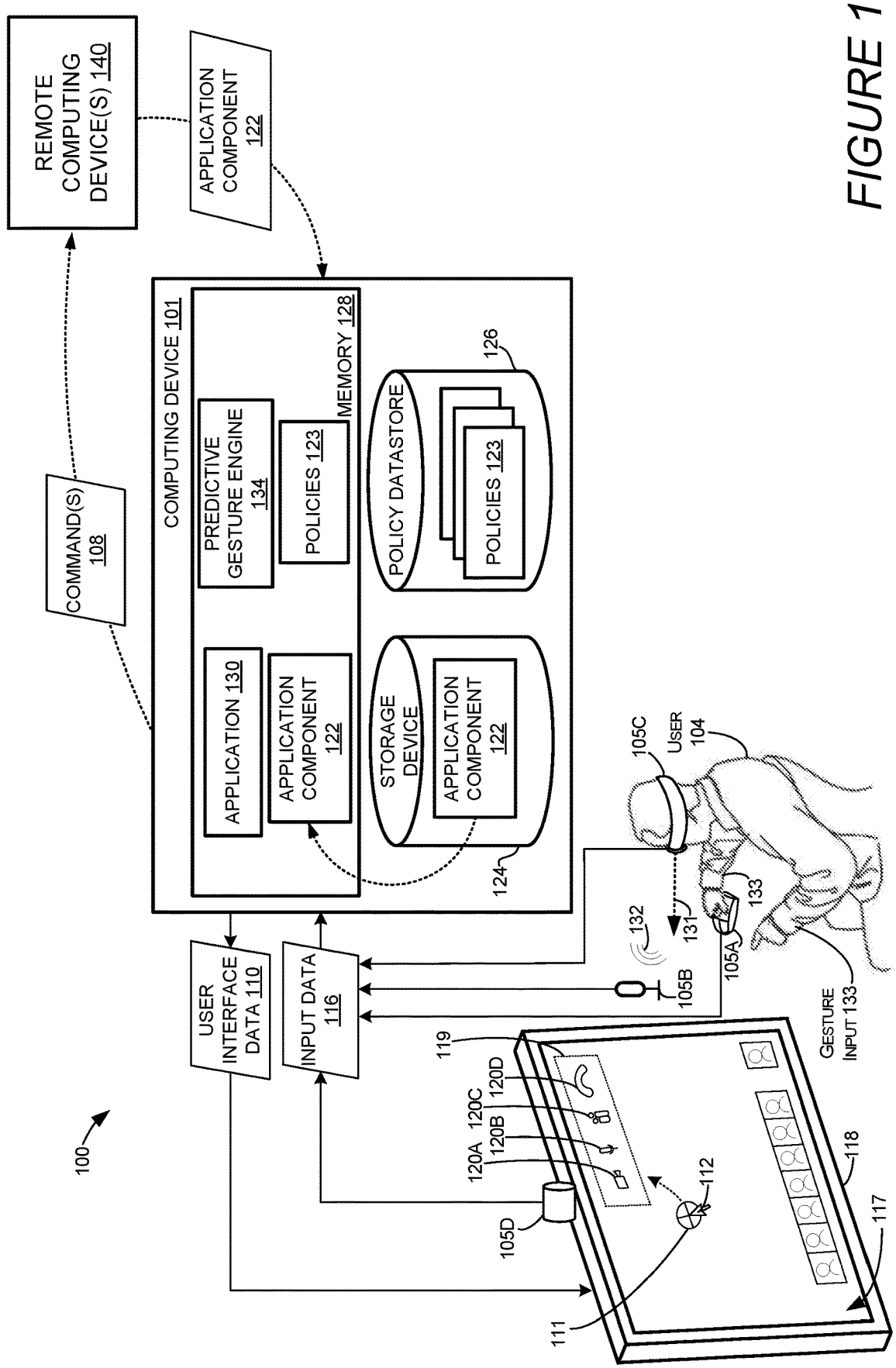

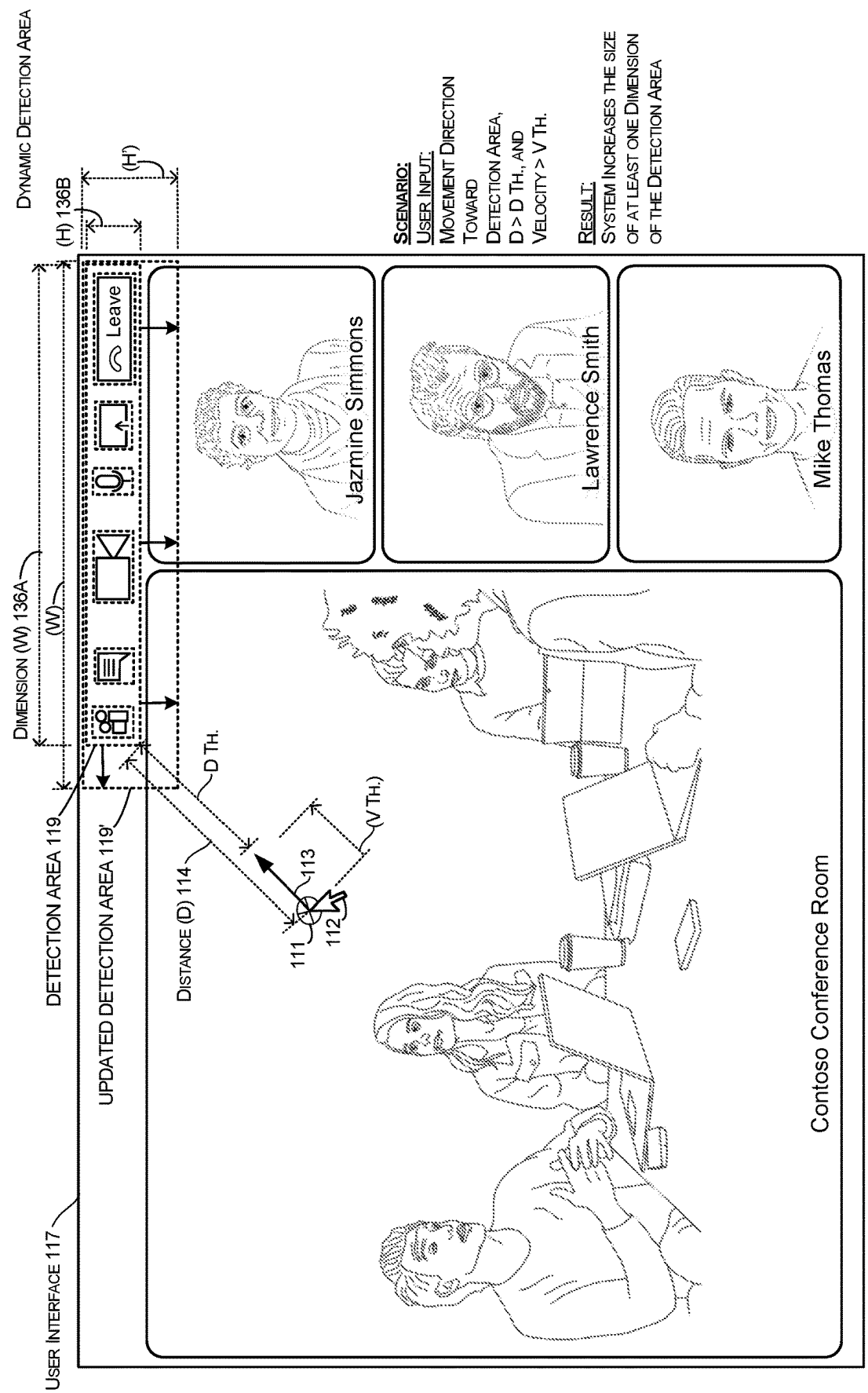

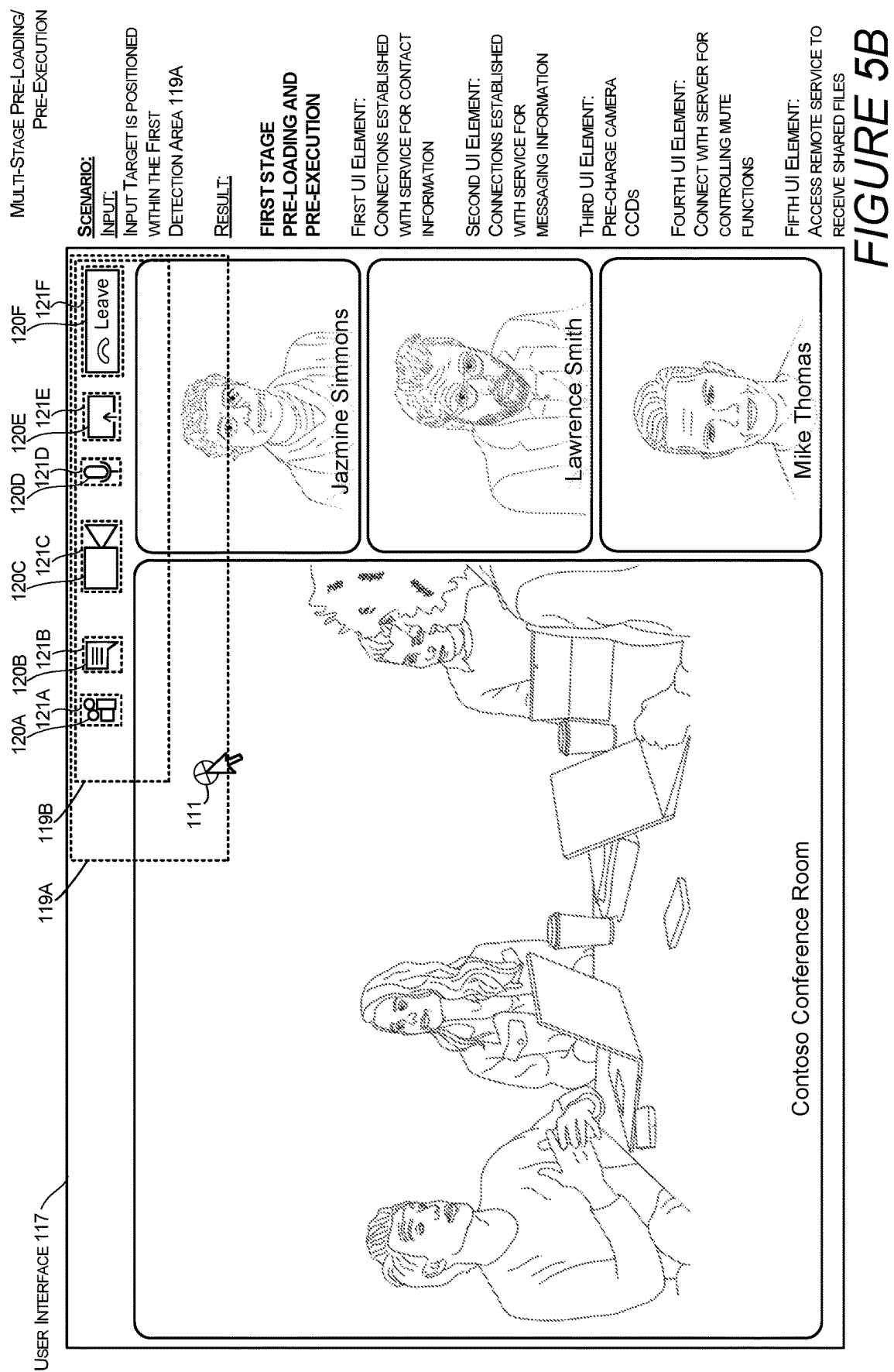

| UI Element and Associated Function | Action at $T_0$ | Action at $T_1$ | Action at $T_2$ | Action at $T_3$ | Action at $T_4$ | Action at $T_5$ |
|---|---|---|---|---|---|---|
| Mute | None | None | None | None | Connect with Server | Instruct Server to Mute User |
| Pin | None | None | None | None | Cache Contact | Remove Contact |
| Drop | None | None | None | None | None | None |
| | None | Load Contacts | Display Contacts | None | None | None |
| | None | Load Messages | None | Purge Messages | None | None |
| | None | Charge CCDs | None | Turn Camera Off | None | None |
| | None | Load Files | None | None | None | None |
| ... | ... | ... | ... | ... | ... | ... |
| Leave | None | None | None | None | None | None |

FIGURE 6C

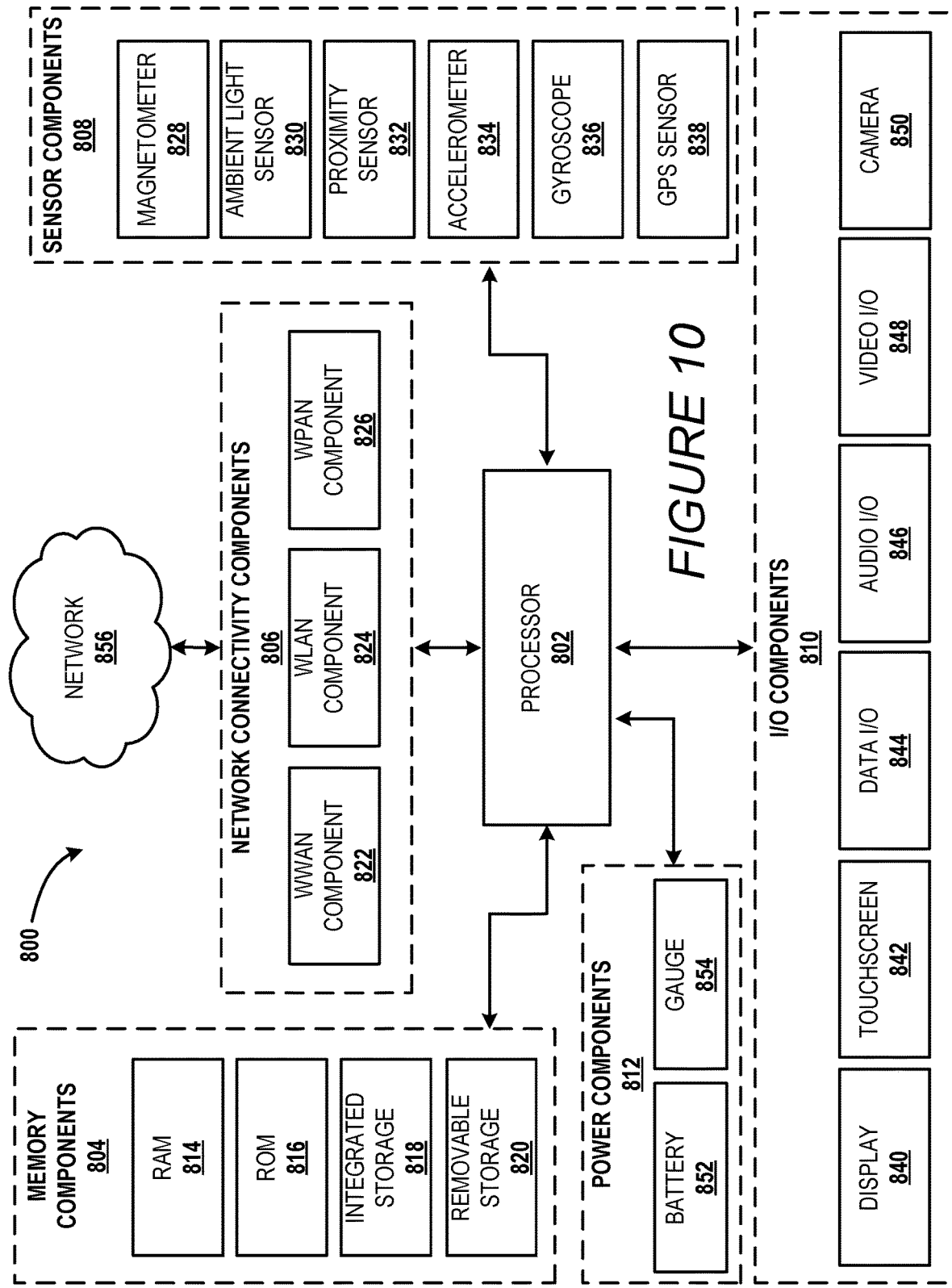

UTILIZATION OF PREDICTIVE GESTURE ANALYSIS FOR PRELOADING AND EXECUTING APPLICATION COMPONENTS

BACKGROUND

Some existing software applications can include a wide range of features that enable users to access and manage data from a number of resources. As a result, some applications can involve complex architectures that may require coordination with a number of remote computers and services. For example, some communication programs enable a number of users to share live video and audio streams while providing access to calendars, phone books, address books, chat messages, shared files, etc. Such applications can coordinate with a number of resources storing all of the different types of content.

Given the complex and interconnected nature of some current systems, some applications have a dependency on a number of application components, which can include data structures storing content and executable libraries. Such structures can have a number of drawbacks, one being that a launch time of an application relying on a number of application components can cause excessive delays. Software developers are continually challenged with the task of minimizing the launch time of an application, as unwanted delays can greatly impact the end-user experience and the overall appeal and utilitarian value of an application.

Application designers have used a number of techniques to help minimize the launch time of an application. For example, some designs specifically select certain components or categories of application data to load into memory when an application is launched. Although this approach can help the performance of an application during an initial launch, the user may experience delays when certain application features are accessed during runtime. If an application component is not loaded into memory during a launch sequence, a computer is then required to use an on-demand load model, which loads the application component into memory or performs other operations when the functionality is initiated by the user. Thus, although an on-demand load model may help an application's launch time, this arrangement causes delays which can impact an application's overall responsiveness.

It can be appreciated that there is a need for solutions that optimize both the responsiveness and launch time of an application. It is with respect to these and other technical challenges that the disclosure made herein is presented.

SUMMARY

The techniques disclosed herein utilize anticipated user actions determined by a predictive gesture analysis to preload and/or execute application components to provide improved efficiency, responsiveness and launch times in software applications. In some configurations, a system can monitor user input gestures to determine if a user-controlled cursor moves into a detection area positioned in proximity to one or more selectable user interface ("UI") elements. When a user input causes a cursor to move into the detection area, the system can preload or execute one or more application components that are associated with the UI elements. The system can also dynamically adjust the position, size and/or shape of the detection area based on a number of factors, including the presence of one or more predetermined input gestures. By dynamically adjusting aspects of a detection area used for initiating actions for associated application components, the system can optimize the predictive techniques used for identifying the intent of a user. In addition to improving the response time of functions during execution of an application, the optimized predictive techniques can allow applications to reduce an initial amount of information loaded into memory to reduce an application's launch time.

In some configurations, the system can cancel pre-executed operations or purge stored data that is pre-loaded into memory in response to the detection of a predetermined input gesture. For example, if a user interface of an application comprises two UI elements, a button for displaying contact information and a button for displaying message information, the system may load both sets of information when a user input cause a cursor to enter a detection area. When the cursor meets one or more criteria with respect to one of the UI elements, the system may purge the loaded information of the other UI element to optimize the use of memory resources. For instance, when the cursor moves within a threshold distance of the button for displaying contact information, the system may purge the pre-loaded message information.

In some configurations, the system can initiate actions for the application components in predetermined stages. For example, if a communication application utilizes a number of application components for retrieving contact information for meeting participants, a system may need to execute a number stages: establish a connection with a remote service, retrieve the contact information, and load the contact information into memory. The system can control the execution of each stage based on the detection of user input gestures with respect to multiple detection areas. In some configurations, the detection areas can be concentrically arranged around one or more UI elements. Each detection area can create a layer associated with each stage of a multi-stage process for providing a more granular level of control of the computing resources that may be used.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 is a block diagram of a system for providing improved responsiveness and loading times in software applications.

FIG. 3B shows an example of a first input gesture that can be used in a process for dynamically adjusting a detection area.

FIG. 5B shows an example user interface and a second state of an input target in a process for executing or pre-loading stages of application components.

FIG. 6C shows a table of actions for executing, pre-loading, cancelling and purging application components based on the input gestures depicted in FIGS. 6A and 6B.

FIG. 10 is a computer architecture diagram illustrating a computing device architecture for a computing device capable of implementing aspects of the techniques and technologies presented herein.

DETAILED DESCRIPTION

Figure 2A:
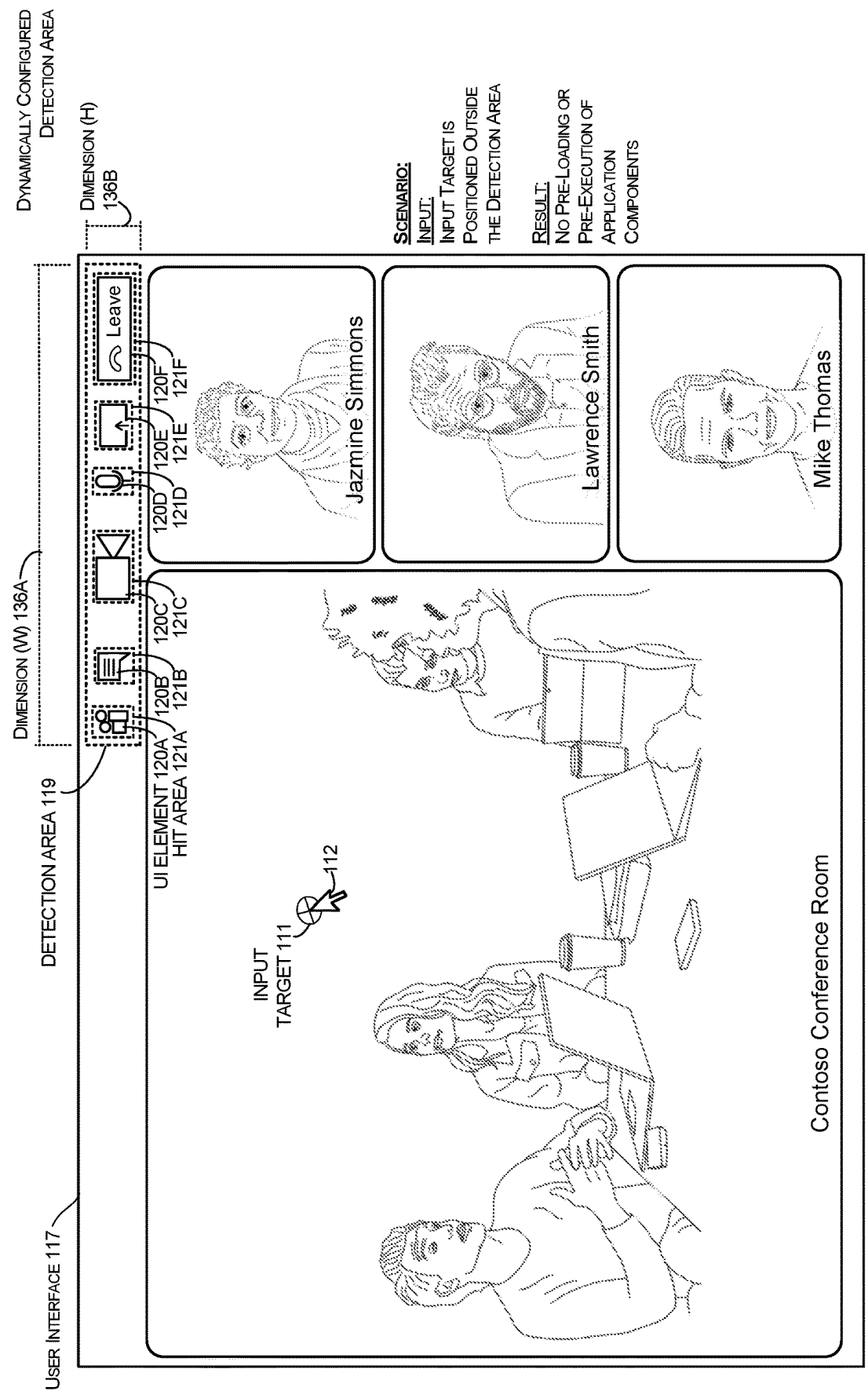
FIG. 2A shows an example user interface and a first state of an input target in a process for dynamically adjusting a detection area.

FIG. 1 illustrates a system 100 for implementing aspects of the present disclosure. Generally described, the system 100 can improve the efficiency of a computing system by utilizing predictive gestures to preload and/or pre-execute application components. In this illustrative example, a predictive gesture engine 134 can enable a computing device 101 to monitor user input gestures using any combination of input devices 105 to determine if a user-controlled input target 111, e.g., a mouse cursor 112, moves into a detection area 119 positioned in proximity to one or more selectable user interface ("UI") elements 120. When a user input causes the input target 111 to move into the detection area 119, the computing device 101 can preload or execute one or more application components 122 in memory 128. The application components 122 can be used by the application's 130 functionality associated with selectable UI elements 120. Thus, when a user selects an individual UI element (120A-120D), access to the application components 122 is provided without the delay caused by an on-demand load paradigm. The computing device 101 can also modify the size, position, and/or shape of the detection area 119 to optimize the detection of predictive gestures for initiating the preload and/or pre-execution operations.

The computing device 101 can dynamically modify the size, position, and/or shape of the detection area 119 based on a number of factors. For example, the computing device 101 can modify at least one dimension of the detection area 119 based on the detection of one or more predetermined input gestures. The computing device 101 can analyze the attributes of the input data 116 to determine if a direction, position, and/or velocity of the input target 111 meets one or more criteria with respect to the detection area 119. Once the input target 111 meets one or more criteria with respect to the detection area 119, the computing device 101 can increase or decrease the size of the detection area 119, change the shape of the detection area 119, and/or move the detection area 119 to any location within the user interface 117. In one illustrative example, if a user input gesture causes a cursor to move towards the detection area 119, the detection area 119 can increase in size. The computing device 101 continues to monitor the input gestures and once input data 116 indicates that the input target 111 moves within the detection area 119, the computing device 101 can preload and/or execute one or more application components 122.

The computing device 101 can utilize criteria to determine if an input gesture is to initiate a modification the detection area 119. The criteria can be stored within one or more policies 123 of a policy datastore 126. The criteria can define distance thresholds, velocity thresholds, and coordinates identifying predetermined locations and areas within a user interface 117. As will be described in more detail below, the thresholds and criteria defined in the one or more policies 123 can be adjusted by the use of one or more machine learning techniques that detect and utilize user activity over time. By dynamically adjusting aspects of a detection area used for preloading or executing one or more application components 122, the computing device 101 can optimize the predictive techniques used for identifying the intent of a user. In addition to improving the response time of various functions during the execution of an application 130, the dynamically configured detection areas can allow the design of applications 130 to minimize an initial amount of data loaded into memory 128 and reduce an application's launch time.

The input devices 105 can include any type of device for detecting one or more user gestures, such as, but not limited to, a pointing device 105A (e.g., a mouse, trackball, touchpad, digital pen, touch screen, etc.), a microphone 105B for receiving voice input 132, a head-mounted display (HMD) device 105C or a camera 105D for tracking a gaze gesture 131 or a hand gesture 133. The generation of input data 116 can be from any combination of input devices 105 or any single device 105. The input data 116 can be interpreted to determine the position, velocity, and direction of the input target 111. An input target 111 can be controlled by any form of user input device suitable for generating coordinates of the input target 111 within a rendering of a user interface 117. Coordinates of the input target 111 can be stored over time, and the analysis of which can identify specific movement gestures of the input target 111. In some embodiments, the input target 111 can be associated with a cursor 112 or any other suitable of graphical element.

The computing device 101 can generate user interface data 110 to generate a rendering of the user interface 117 on a display device 118. The user interface 117 can include a number of selectable graphical elements 120 each associated with specific functionality of the application 130. The user interface data 148 can also define the detection area 119 that can be used to determine a user's intent with respect to a selectable graphical element 120. In some configurations, when the input target 111 performs a gesture that meets one or more criteria with respect to the detection area 119, the computing device 101 can take one or more actions including, but is not limited to, preloading one or more application components 122 from a storage device 124 to a memory device 128, issuing a command 108 to cause a remote computing device 140 to execute one or more operations and/or preload one or more application components 122 received from a remote computing device 140.

The memory 128 can include any type of hardware configured to store data, such as, but not limited to, random-access memory or cache that allows applications to access data more quickly than long-term storage devices 124 such as a hard drive, solid-state drive, or the like. By pre-loading a select set of application components 122, which can include both executable code and data that is to be consumed by the application, the application 130 can access these components quickly when a user selects any UI element and initiates functionality that uses the application components 122. Having access to an application component 122 loaded in memory prior to a user selection of a UI element allows the application 130 to respond more quickly than reactively loading the application components 122 to memory in response to the user selection of the associated UI element.

In some configurations, an application component 122 can include any type of data that is to be received, displayed, processed, managed, edited, or communicated by a software application. For example, an application component can include contact information pertaining to a group of people, including but not limited to, names, phone numbers, email addresses, office addresses, title, rank, priority, role, etc. The application component 122 can also include executable code for performing pre-executed operations. For instance, the execution of an application component 122 can cause a client computing device 101 to initiate a connection with a remote computer 140, request information from the remote computer 140, or initiate complex commands such as a remote mute command for a communication service managing a multiparty communication session. These examples are provided for illustrative purposes and are not to be construed as limiting.

In some configurations, the position, size and/or shape of the detection area can be modified based on attributes of an associated application component. For instance, an application component may include an address book that is to be consumed by the application. In some configurations, the size of the detection area may be enlarged in response to determining that the size of the address book exceeds a particular threshold. A larger address book can take a longer time to load into memory. Thus, by having a larger detection area, the computing system can provide more time, which may be in order of milliseconds, to preload at least a portion of the address book.

In another illustrative example, an application component may include executable code that performs a number of operations. In some configurations, the size of the detection area may be enlarged in response to determining that the number of operations, or a value indicating a complexity level of the number of operations, exceeds a particular threshold. Thus, by having a larger detection area, the computing system can provide more time to complete the operations performed by any associated application components.

Referring now to FIGS. 2A-2E, an example user interface 117 comprising a detection area 119 surrounding a number of UI elements 120 and corresponding hit areas 121 is provided to illustrate aspects of the present disclosure. As shown in FIG. 2A, the user interface includes six UI elements (120A-120F) associated with individual hit areas (121A-121F) each surrounding individual UI elements. The detection area 119 is positioned in proximity to, and sometimes around, the UI elements 120. The user interface 117 is configured such that when the input target 111 is positioned within the detection area 119, one more preloading or pre-execution actions may be initiated. The user interface 117 is also configured such that when the input target is positioned within a hit area 121 during a user input action, such a voice command or a mouse click, functionality of the application that is associated with the corresponding hit area 121 can be initiated. The selected functionality of the application can then utilize the pre-loaded or pre-executed application components.

In some configurations, the computing device can receive input data 116 indicating a location of an input target 111 on the graphical user interface 117 displayed on the display device 118. The computing device can then analyze gesture properties of the input target 111, such as the direction of movement, velocity, and starting position, ending position of a movement gesture, to determine if the direction of the input target 111, velocity, or a location of the input target 111 meets one or more criteria with respect to the detection area 119. In response to determining that the direction, velocity and/or the location of the input target 111 meets the one or more criteria with respect to the detection area 119, the computing device can adjust at least one dimension, or any other physical characteristic, of the detection area 119.

In the example shown in FIG. 2A, the computing device receives input data that positions the input target 111 near the center of the user interface, outside of the borders of the detection area 119. Based on this type of user input, the computing device does not preload or pre-execute an application component. In addition, the computing device does not resize, reshape or move the detection area 118. As shown, based on the given input data in this example, the dimensions 136 of the detection area 119 remain constant.

Figure 2B:
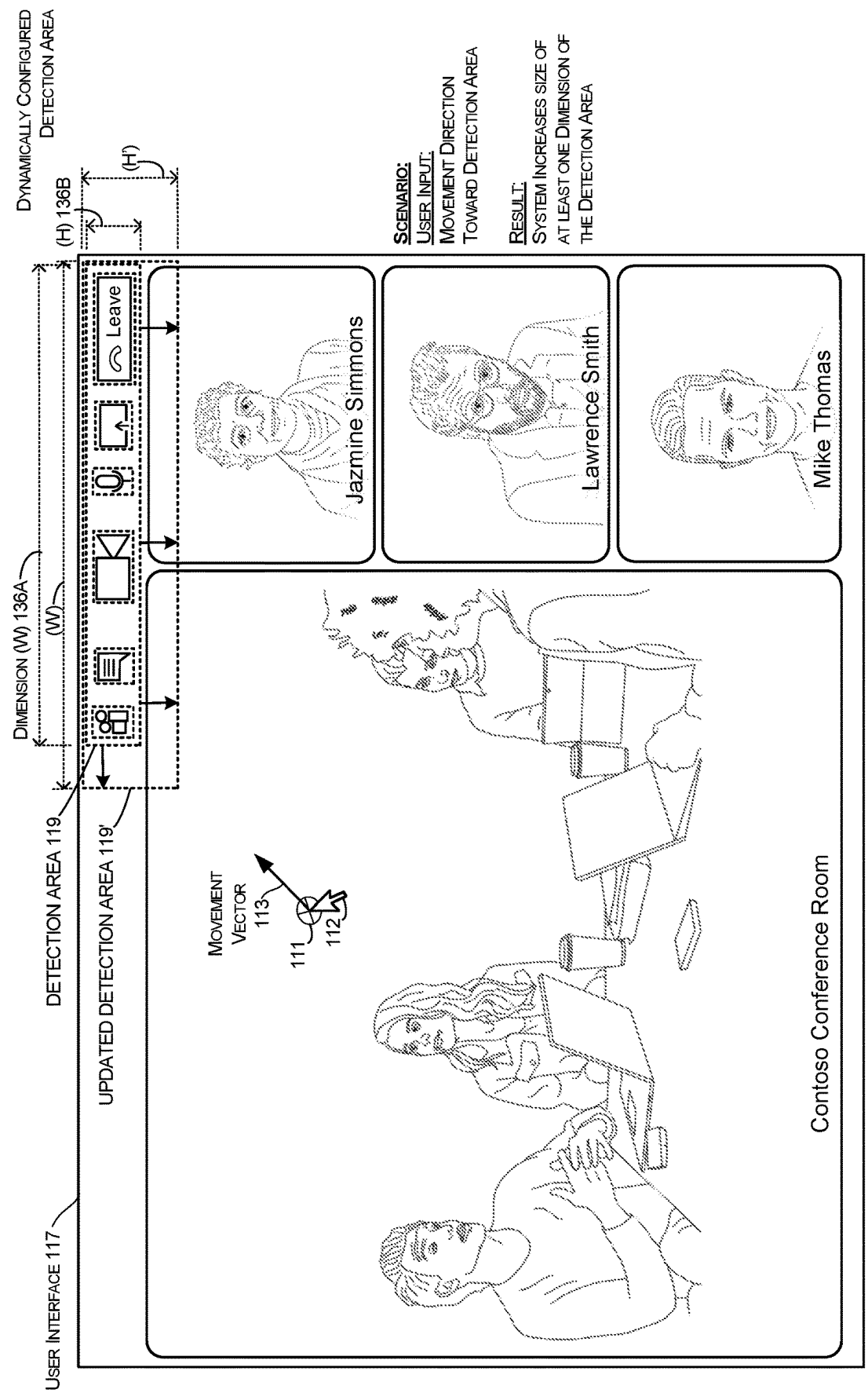
FIG. 2B shows an example user interface and a second state of an input target and an updated detection area in a process for dynamically adjusting a detection area.

As shown in FIG. 2B, the computing device receives input data that positions the input target 111 outside of the detection area 119 moving in a direction toward the detection area 119. Based on such a user input, the computing device changes at least one dimension 136 of the detection area 119 to generate an updated detection area 119'. In this particular example, a width (W) 136A and a height (H) 136B are modified to an adjusted width (W') and an adjusted height (H'). In some configurations, the detection area can be increased in size in response to determining that the input target 111 is moving towards the detection area. In another configuration, the detection area can be increased in size in response to determining that the input target 111 is moving towards the detection area with at least a threshold velocity.

These examples are provided for illustrative purposes and is not to be construed as limiting. It can be appreciated that any type of movement of the input target 111 can cause a computing device to change any combination of dimensions to increase the size of the detection area 119. In addition, the shape and/or position of the detection area may be changed based on a number of factors. For instance, the detection area 119 may be moved to a new position closer to an input target 111 if the input target 111 is moving toward the detection area 119. In another example, one side of the detection area may expand into an arc or another shape that is directed towards the input target 111 if the input target is moving toward the detection area 119. The shape of the detection area may be based on other factors as well. For instance, if there is only one or two UI elements within a particular detection area, the detection area may have a circular shape. In such an embodiment, when a user input meets one or more criteria with respect to the detection area, the computing device may increase the radius of the detection area.

Figure 2C:
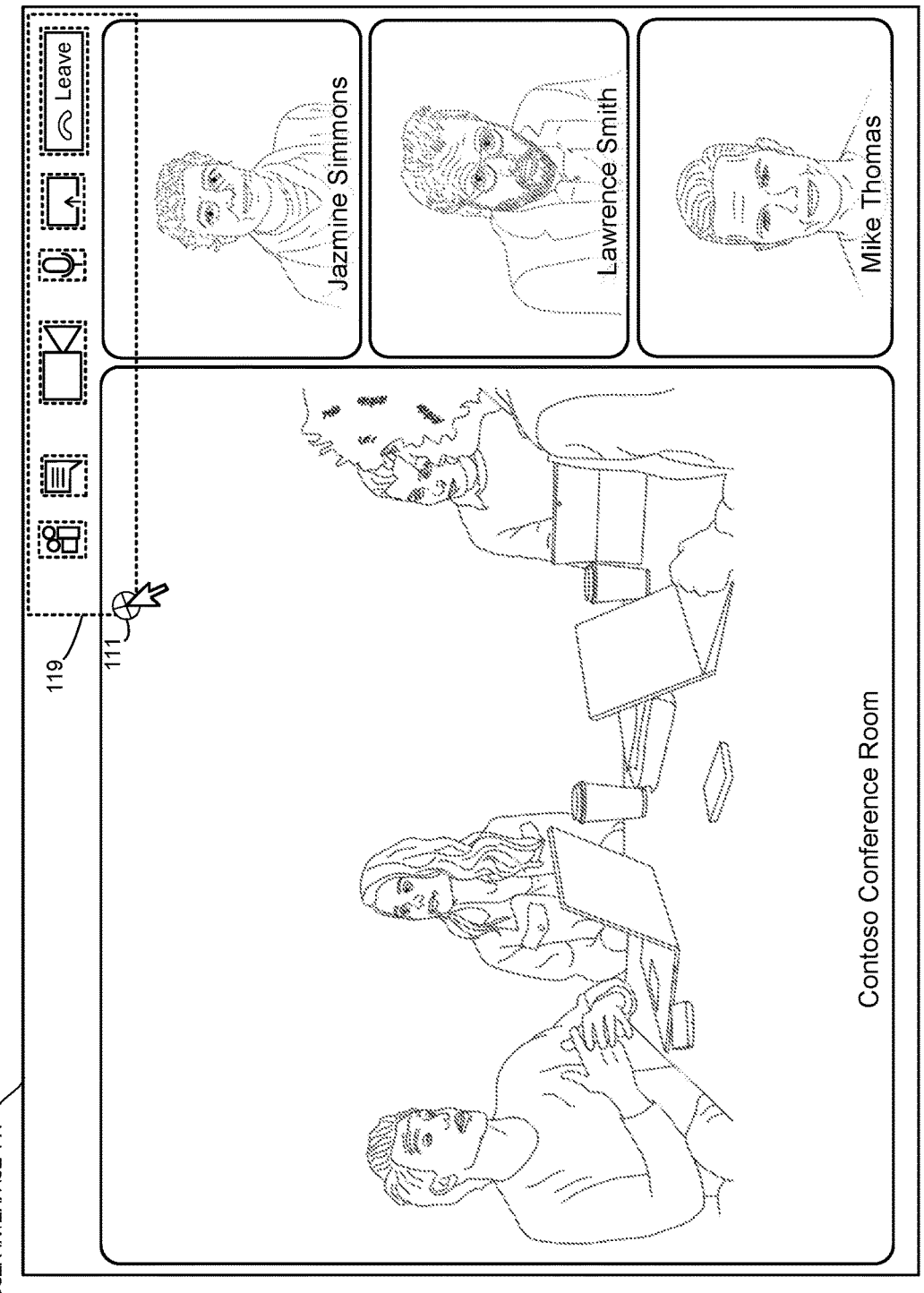
FIG. 2C shows an example user interface and a third state of an input target in a process for dynamically adjusting a detection area.

In the example shown in FIG. 2C, the computing device receives input data that positions the input target 111 within the detection area 119. Based on such a user input, the computing device can execute or load any application component associated with the user interface elements positioned within the detection area 119. For example, a user interface element, such as the first UI element, may be associated with functionality for causing a display of contact information. In such embodiments, in response to determining that the input target is within the detection area, the computing device may establish a connection with a server storing the contact information. In another example, in response to determining that the input target is within the detection area, the computing device send request to a service to retrieve the contact information for storage into memory.

Figure 2D:
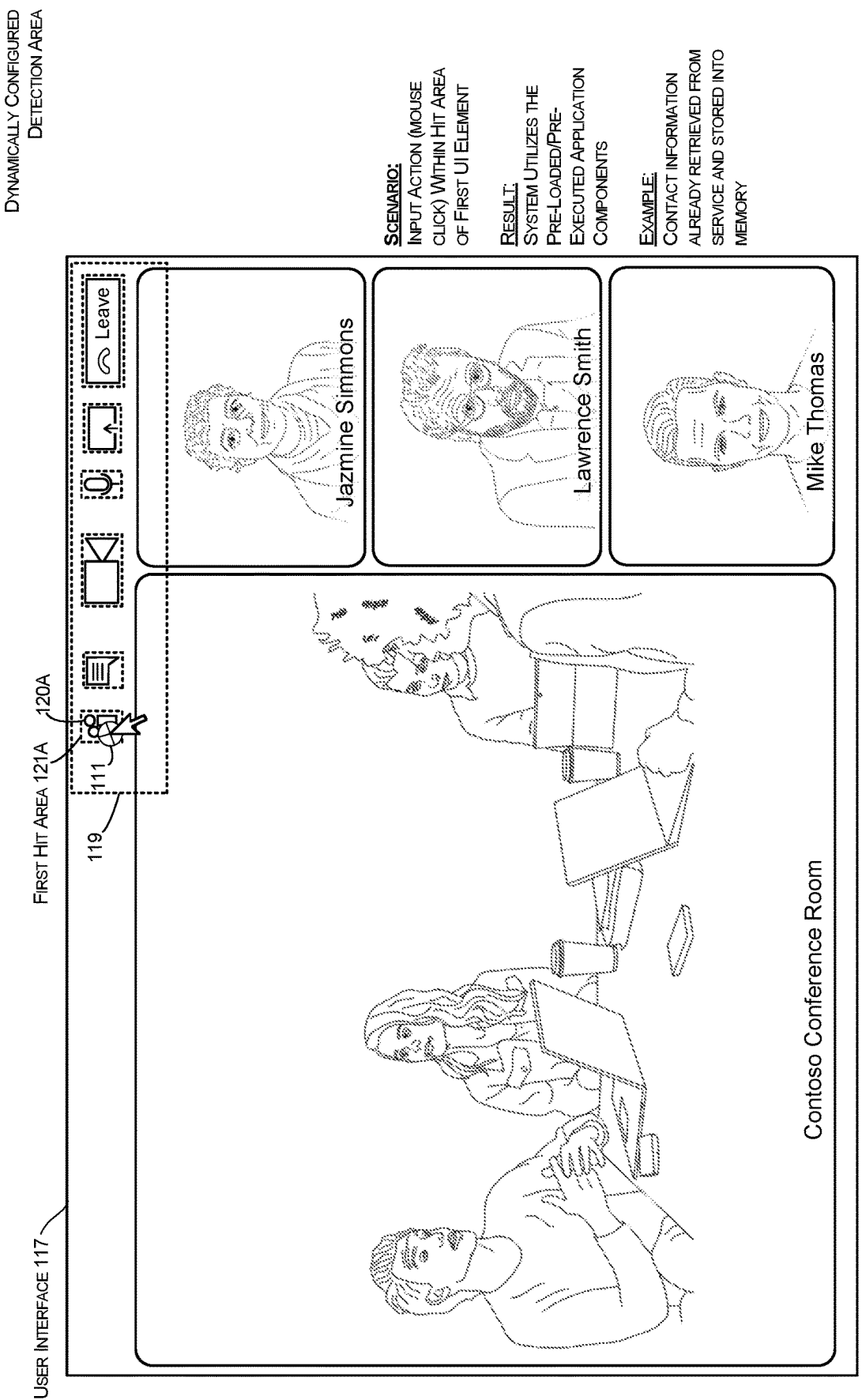
FIG. 2D shows an example user interface and a state of an input target in a process selecting a user interface element.
Figure 2E:
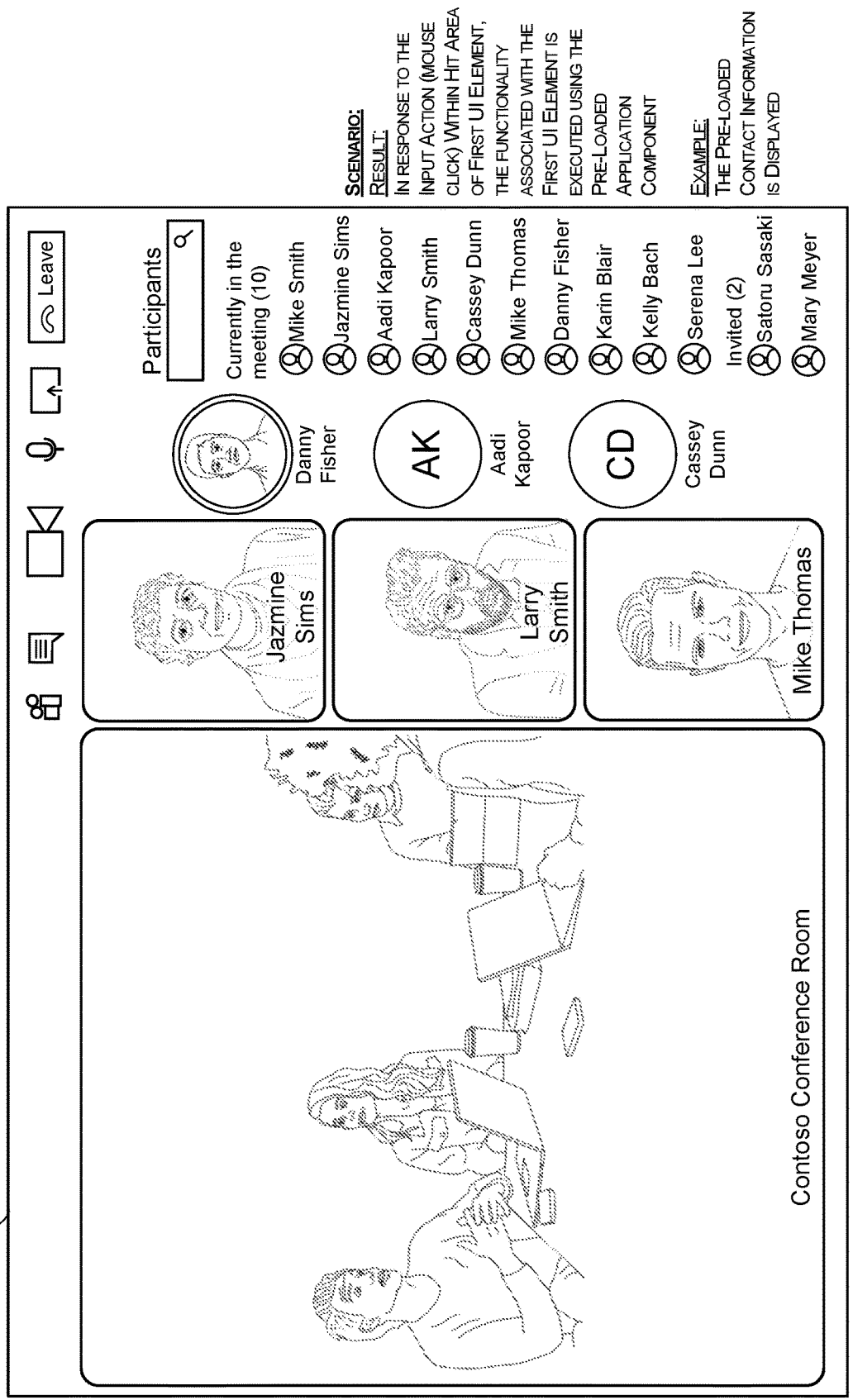
FIG. 2E shows an example user interface that can be displayed in response to the selection of the user interface element depicted in FIG. 2D.

In the example shown in FIG. 2D, the computing device receives input data that indicates that an input action, such as a mouse click or a voice command, occurred while the input target 111 is positioned within the hit area 121A of the first UI element 120A. Based on such a user input, the computing device can execute functionality of the application 130 that utilizes the preloaded or pre-executed application component 122. For instance, as shown in FIG. 2E, in continuing the example involving the contact information, the user interface 117 can transition to a display comprising a list of people with their contact information that was retrieved in the pre-loading/pre-execution process.

Referring now to FIGS. 3A-3E, several example scenarios involving velocity thresholds and/or distance thresholds for identifying specific types of input gestures are shown and described below. In the example shown in FIG. 3A, example input data indicates that the input target 111 and a corresponding cursor 112 are located outside of the detection area 119. In this example, the input target 111 is at a distance (D) 114 from the detection area 119. In addition, the input data indicates that the input target 111 is moving towards the detection area at a given velocity, as shown by the movement vector 113. In this example, the input target 111 is moving towards the detection area with a velocity that is less than a velocity threshold (V. Th.). In addition, the distance between the input target and the detection area is greater than a distance threshold (D. Th.). Given these parameters generated from the input data, the computing device controls the size of the detection area 119 to remain at a current size, position, and/or shape.

In the example shown in FIG. 3B, input data indicates that the input target 111 and a corresponding cursor 112 are located outside of the detection area 119. In this example, the input target 111 is at a distance (D) 114 that is beyond a threshold distance from the detection area 119. In addition, the input data indicates that the input target 111 is moving towards the detection area at a given velocity, as shown by the movement vector 113. In this example, the input target 111 is moving towards the detection area with a velocity that is greater than the velocity threshold. In addition, the distance between the input target and the detection area is greater than a distance threshold. Given these parameters generated from the input data, the computing device increases the size of the detection area 119 to generate an updated detection area 119'.

Figure 3A:
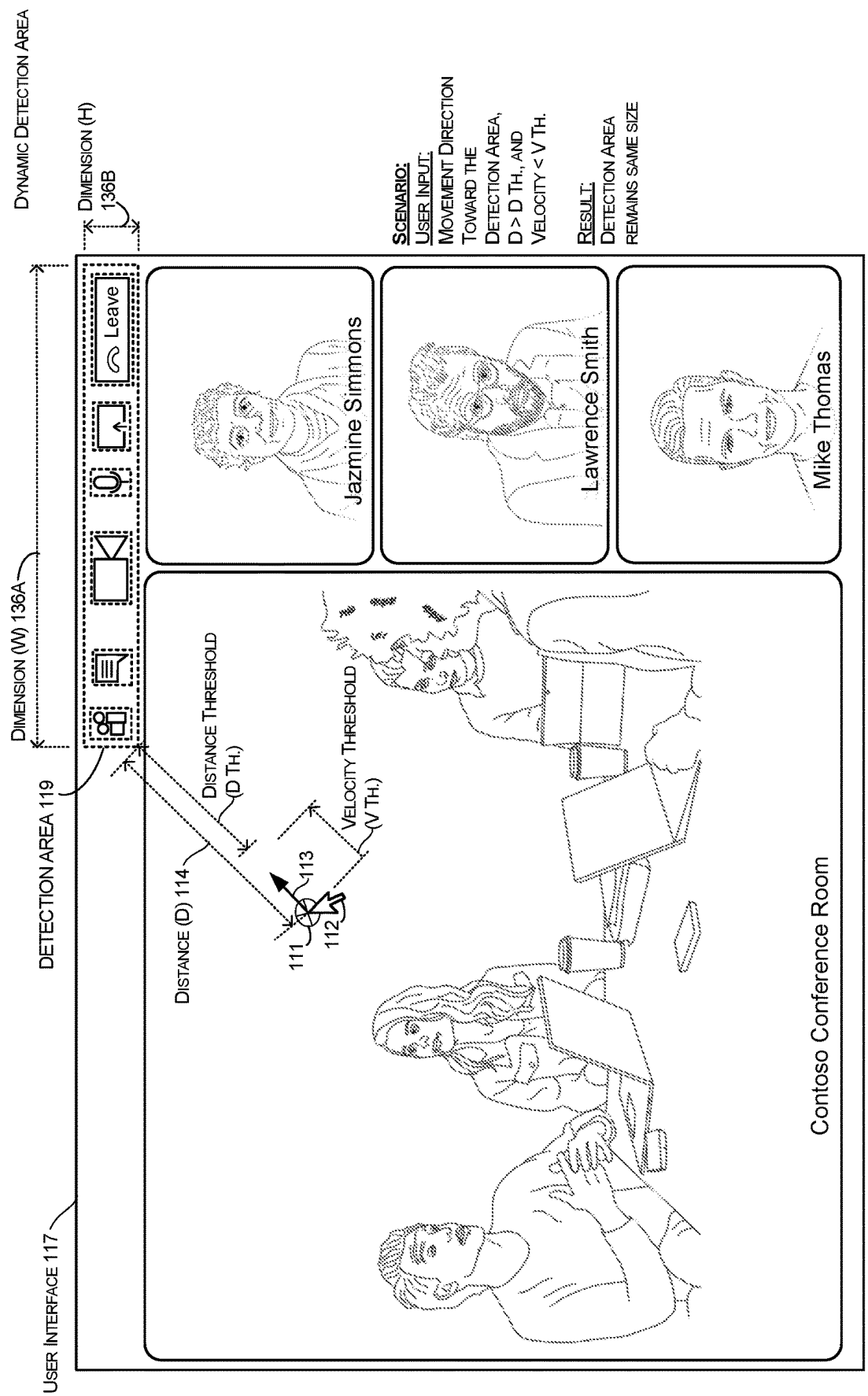
FIG. 3A shows an example of an input gesture that can be used in a process for maintaining a size, position, and shape of a detection area.
Figure 3C:
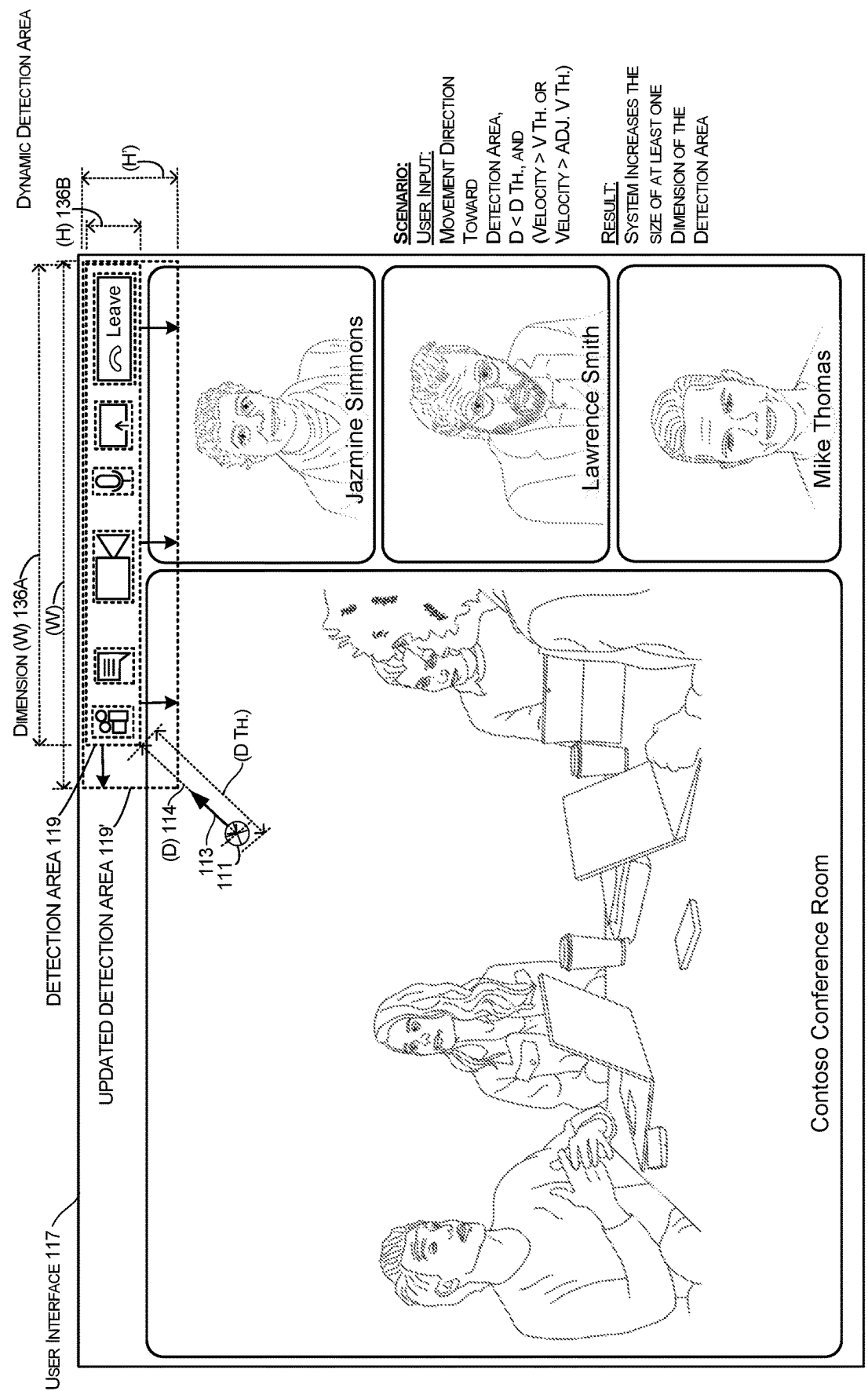
FIG. 3C shows an example of a second input gesture that can be used in a process for dynamically adjusting a detection area.

In the example shown in FIG. 3C, input data indicates that the input target 111 and a corresponding cursor 112 are located outside of the detection area 119. In this example, the input target 111 is at a distance (D) 114 from the detection area 119. In addition, the input data indicates that the input target 111 is moving towards the detection area at a given velocity, as shown by the movement vector 113. In this example, the distance between the input target and the detection area is less than a distance threshold. Given these parameters generated from the input data, the computing device increases the size of the detection area 119 to generate an updated detection area 119'.

In some alternative embodiments, the computing device can increase the size of the detection area 119 in response to determining that the distance between the input target and the detection area is less than a distance threshold when the input target 111 is moving towards the detection area with a velocity that is greater than a first velocity threshold or an adjusted velocity threshold. The system may use an adjusted velocity threshold, which can be lower than the first velocity threshold, when the input target 111 is within a threshold distance of the detection area 119. Such adjustments to the thresholds may allow a system to be more reactive to slower cursor movements when the input target 111 is close to the detection area 119.

Figure 3D:
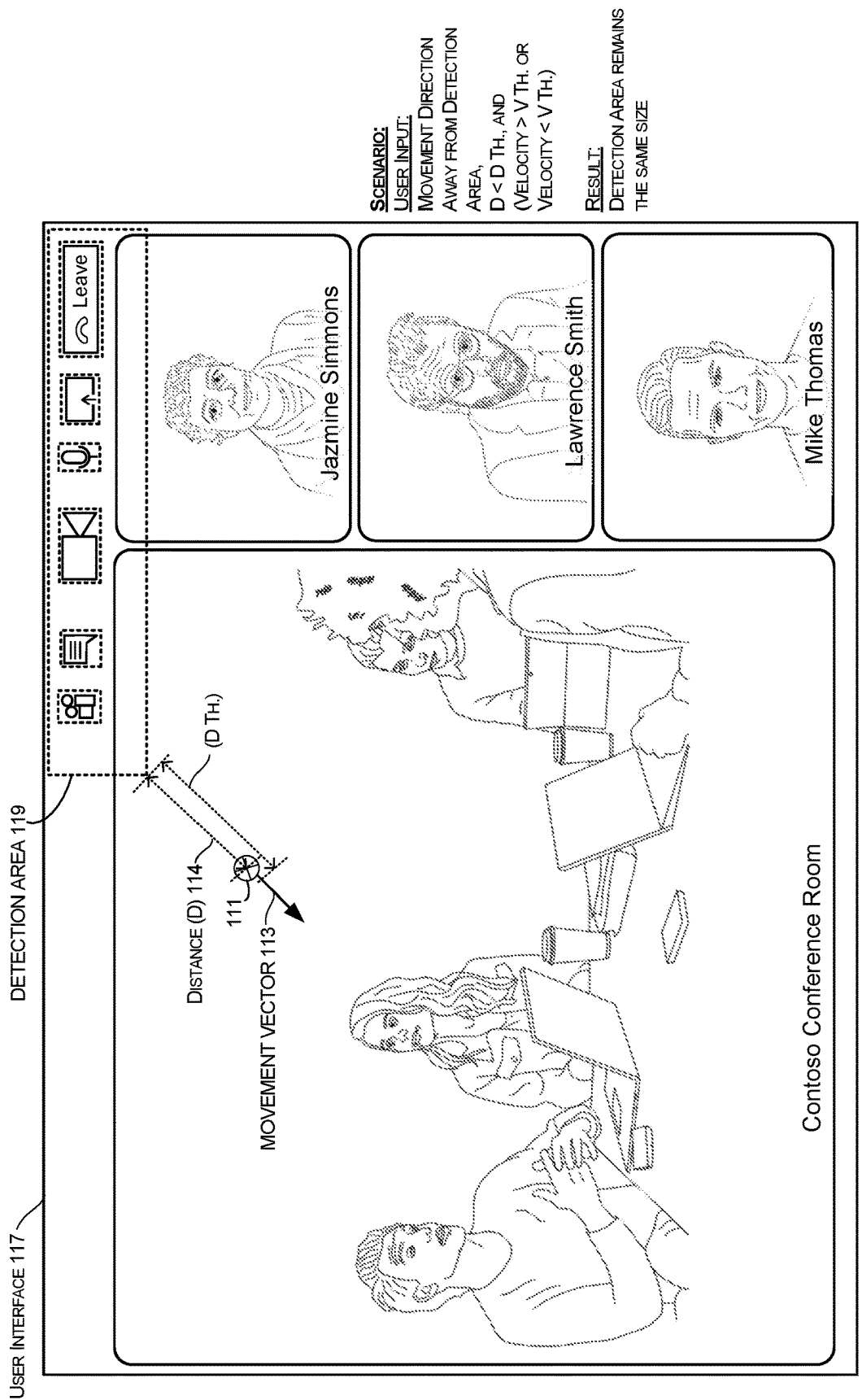
FIG. 3D shows an example of another input gesture that can be used in a process for maintaining a size, position, and shape of a detection area.

In the example shown in FIG. 3D, input data indicates that the input target 111 and a corresponding cursor 112 are located outside of the detection area 119. In this example, the input target 111 is at a distance (D) 114 from the detection area 119. In addition, the input data indicates that the input target 111 is moving away from the detection area at a given velocity, as shown by the movement vector 113. In this example, the position of the input target 111 within a threshold distance (D Th.) from the detection area 119. Given these parameters generated from the input data, the computing device controls the size of the detection area 119 to remain at a particular size, position, and/or shape.

A velocity threshold can also be utilized in the embodiment shown in FIG. 3D. For instance, the computing device can maintain the parameters of the detection area in response to determining that the position of the input target 111 is within a threshold distance (D Th.) from the detection area 119 while moving away from the detection area at a velocity that exceeds a threshold velocity. In another example, the computing device can maintain the parameters of the detection area in response to determining that the position of the input target 111 is within a threshold distance (D Th.) from the detection area 119 while moving away from the detection area at a velocity that is below a threshold velocity.

Figure 3E:
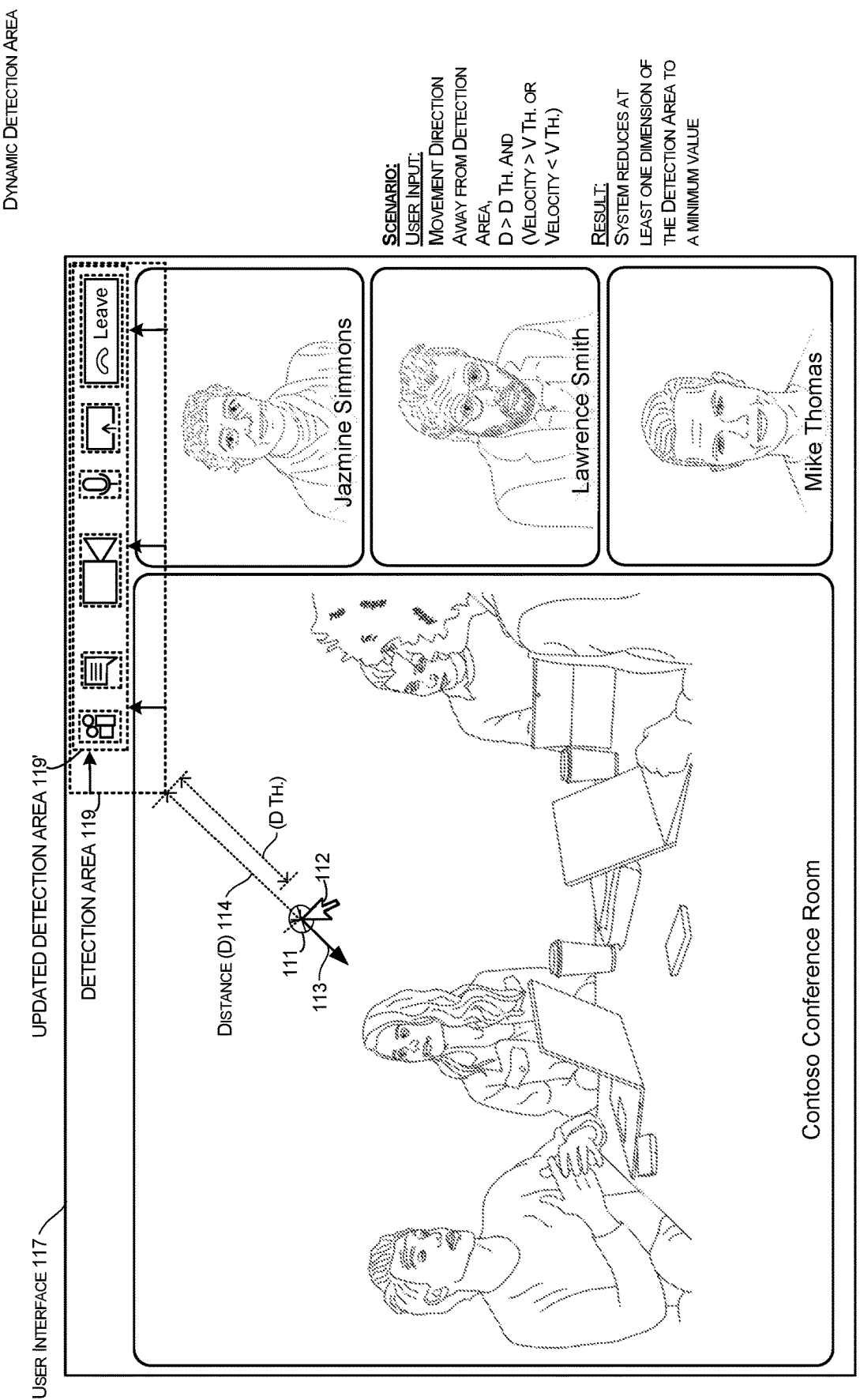
FIG. 3E shows an example of a third input gesture that can be used in a process for dynamically adjusting a detection area.

In the example shown in FIG. 3E, input data indicates that the input target 111 and a corresponding cursor 112 are located outside of the detection area 119. In this example, the input target 111 is at a distance (D) 114 from the detection area 119 that is beyond a threshold distance from the detection area. In addition, the input data indicates that the input target 111 is moving away from the detection area at a given velocity, as shown by the movement vector 113. In this example, the position of the input target 111 beyond a threshold distance from the detection area 119. Given these parameters generated from the input data, the computing device reduces the size of the detection area 119. The detection area can be reduced to any size, which can optionally be limited to a predetermined minimum size that is based on the complexity and/or size of the associated application components.

A velocity threshold can also be utilized in the embodiment shown in FIG. 3E. For instance, the computing device can reduce size of the detection area in response to determining that the position of the input target 111 is beyond a threshold distance (D Th.) from the detection area 119 while moving away from the detection area at a velocity that exceeds a threshold velocity. In another example, the computing device can reduce size of the detection area in response to determining that the position of the input target 111 is beyond a threshold distance (D Th.) from the detection area 119 while moving away from the detection area at a velocity that is below a threshold velocity.

Figure 4A:
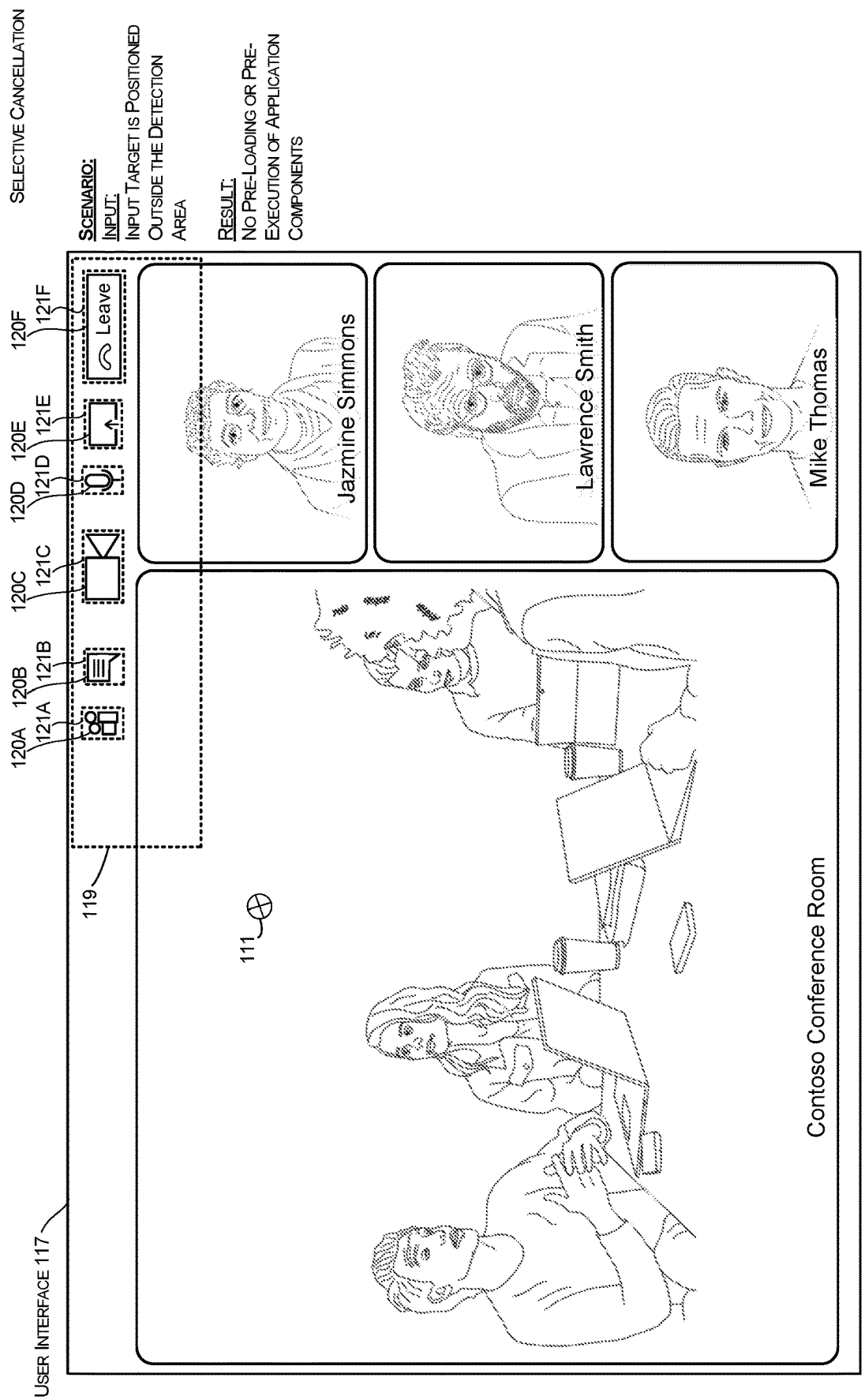
FIG. 4A shows an example user interface and a first state of an input target in a process for canceling one or more actions for executing or pre-loading associated application components.
Figure 4B:
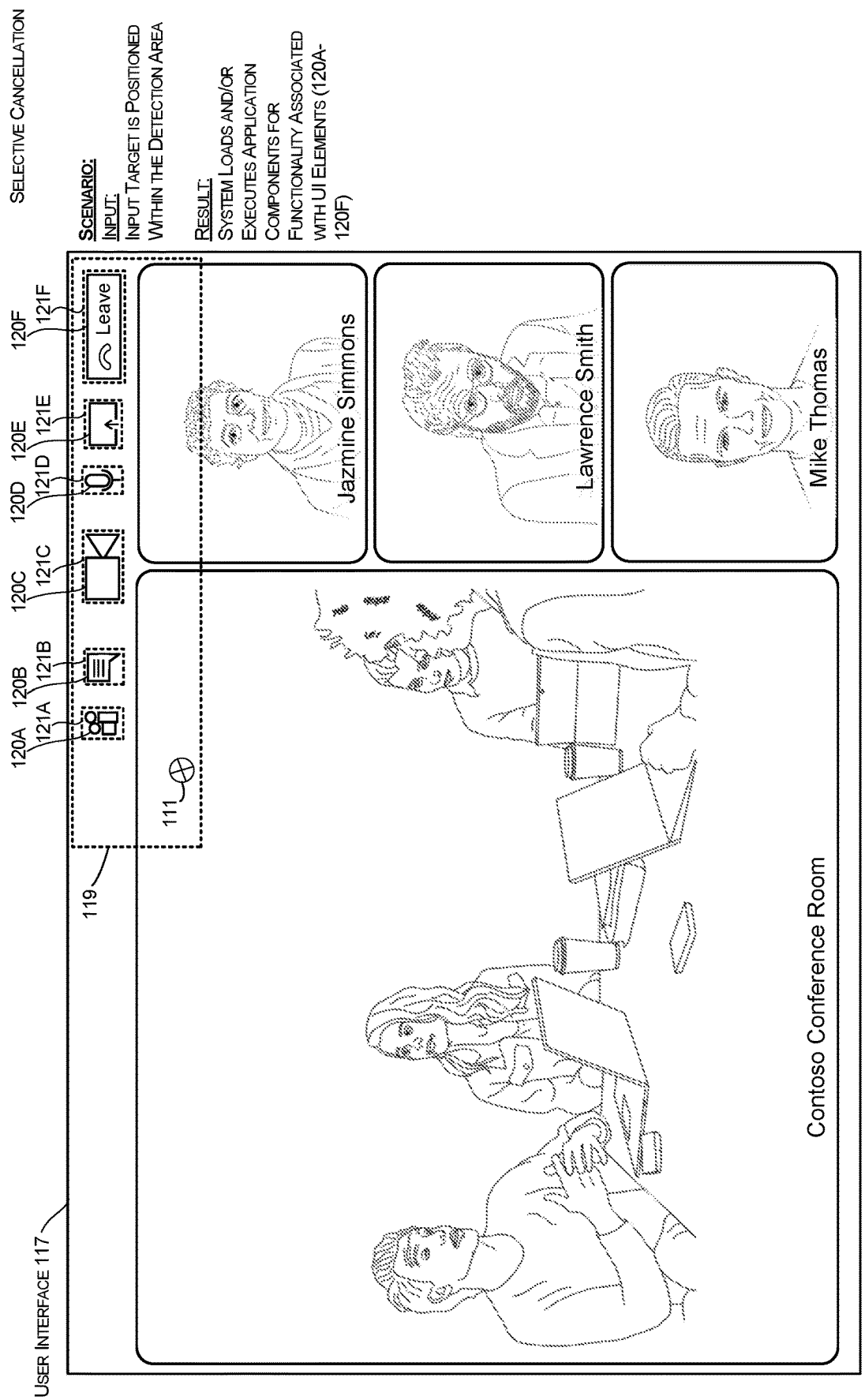
FIG. 4B shows an example user interface and a second state of an input target in a process for canceling one or more actions for executing or pre-loading associated application components.

Turning now to the example shown in FIGS. 4A through 4D, an embodiment involving a selective cancellation process is shown and described below. Generally described, this embodiment can cancel pre-executed operations or purge stored data that is pre-loaded into memory in response to the detection of a predetermined input gesture. This example starts at FIG. 4A where the input target 111 is positioned outside of the detection area 119. Based on this input gesture, the computing device does not initiate any type of loading or execution operations for any application components. Next, as shown in FIG. 4B, when the input target 111 is positioned within the detection area and also beyond a threshold distance to any of the UI elements 120, the computing device can load and/or execute one or more application components associated with the UI elements positioned within the detection area 119.

Figure 4C:
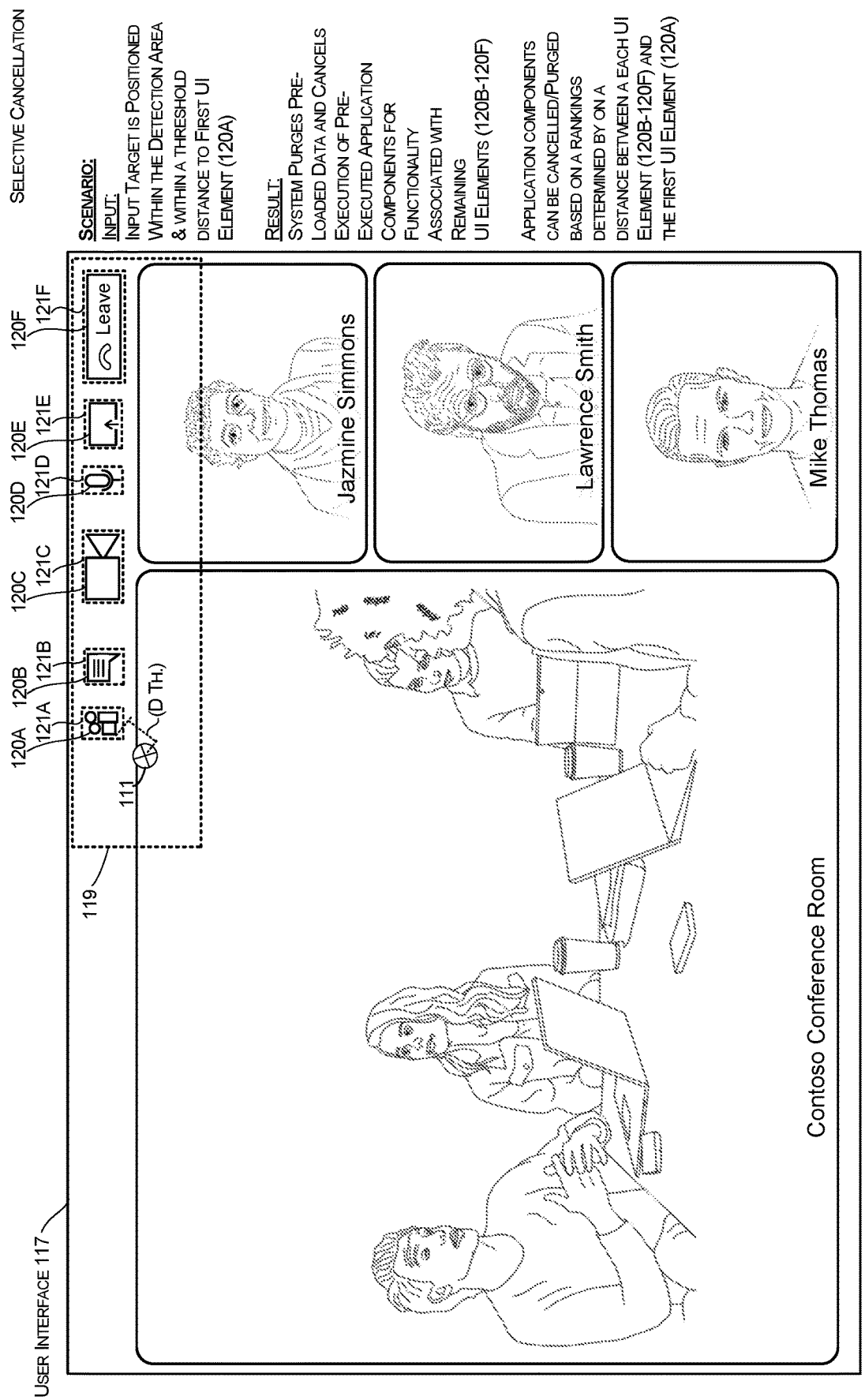
FIG. 4C shows an example user interface and a third state of an input target in a process for canceling one or more actions for executing or pre-loading associated application components.

In this embodiment, once the application components are loaded or executed, the computing device may selectively cancel the execution of an application component or purge an application component from memory in response to detecting that the input target 111 meets one or more criteria with respect to one or more hit areas 121 and/or a corresponding UI element 120. One illustrative example is shown in FIG. 4C. In this example, the computing device may cancel the execution of an application component or purge an application component from memory in response to determining that the input target 111 is positioned within a threshold distance to a particular UI element 120. In response to determining that the input target is positioned within the threshold distance to a particular UI element or a particular hit area, the system can cancel select pre-executed operations of an application component and/or purge select application components from memory.

Figure 4D:
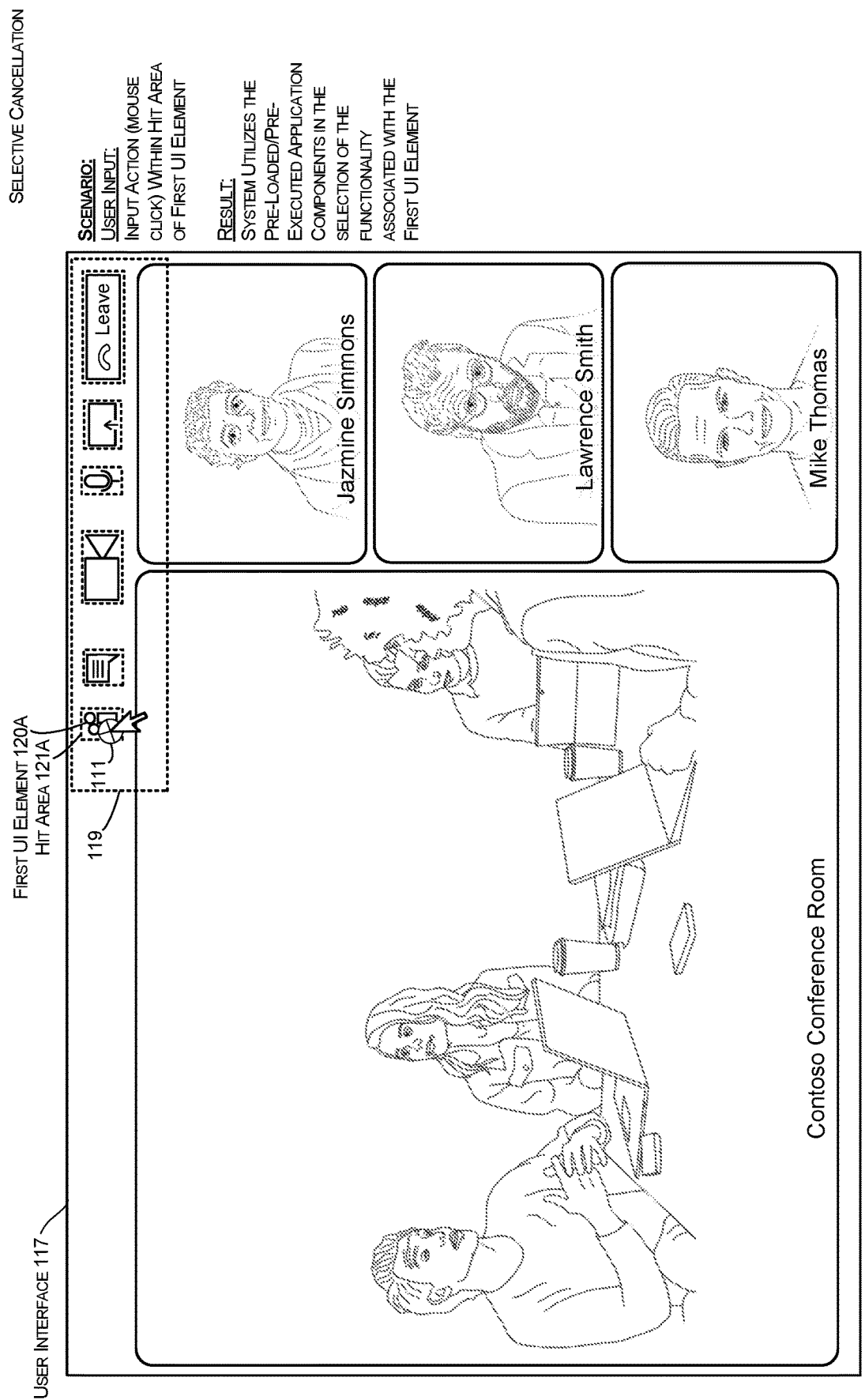
FIG. 4D shows an example user interface and a fourth state of an input target in a process for canceling one or more actions for executing or pre-loading associated application components.

Specific to the illustrative example of FIG. 4C, the input target 111 is within a threshold distance of the first UI element 120A. In response to determining that the input target is within a threshold distance of the first UI element, the system can cancel or purge application components that are associated with the other UI elements, which in this example includes the second UI element 120B through the sixth UI element 120F. For example, any preloaded information such as shared files associated with the sharing functionality the fifth UI element 121E may be purged from memory. In another example, any pre-executed operations for establishing connections, such as a connection with a data resource associated with the message display functionality the second UI element 121B may be terminated. Thus, the computing device can be more efficient with respect to memory resources and other computing resources by only focusing on the storage and execution of application components that are most likely to be selected. As shown in FIG. 4D, once the first UI element 120A is selected for execution, the system can utilize the preloaded or pre-executed application components utilized by the functionality associated with the first UI element 120A.

In some embodiments, the computing device may rank the individual UI elements based on their positions to one another. The rankings may be used to cancel or purge select application components. For example, when the input target 111 is near the first UI element 120A, the system may select the furthest UI element e.g. the sixth UI element 120F, for purging or canceling the execution of associated application components associated with the sixth UI element 120F before cancelling or purging application components associated with the other UI elements (120B-120E). As the input target 1111 moves closer to the first UI element, the system can determine that the user has a higher level of intent to select the first UI element. Thus, as the input target moves closer to the first UI element, the computing device can then purge or cancel the execution of application components associated with additional UI elements by ranking and selecting the furthest remaining UI elements first then processing the other components according to the ranking.

Turning now to FIGS. 5A through 5D, an embodiment involving a multi-stage selection process is shown and described below. Generally described, this embodiment can stage select groups application components to be executed or loaded in response to the detection of a predetermined input gesture. In some configurations, concentrically configured detection areas can be arranged around a number of UI elements. As the input target enters each layer of detection areas, the computing device can load and/or execute select stages of the application components associated with each layer of detection areas.

Figure 5A:
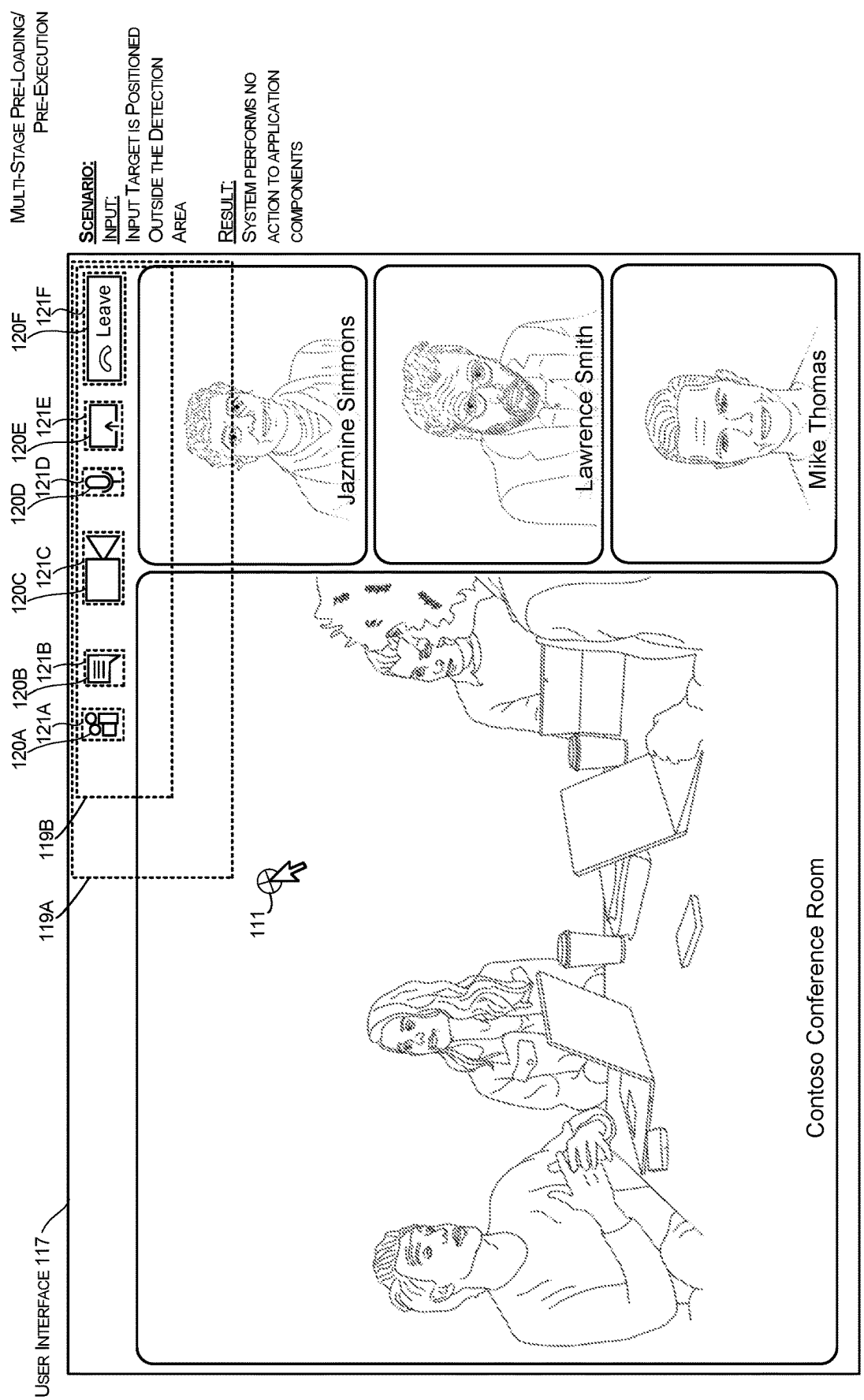
FIG. 5A shows an example user interface and a first state of an input target in a process for executing or pre-loading stages of application components.

In the example shown in FIG. 5A, a user interface 117 can be configured with any number of concentrically configured detection areas 119, such as the first detection area 119A and the second detection area 119B. The detection areas 119 can surround a number of UI elements 120 and corresponding hit areas 121. When the input target 111 is position outside of the detection areas 119, such as this scenario shown in FIG. 5A, the computing device does not load or execute any associated application components.

As shown in FIG. 5B, when the input target 111 is moved into the first detection area 119A, the computing device invokes a first stage of load and/or execution operations. For example, with respect to the first UI element, the computing device may initiate one or more connections with a service storing contact information. For the second UI element, the computing device may initiate one or more connections with a service storing messaging information. For the third UI element, the computing device may take one or more actions to prepare a hardware device. In this example, as part of the first stage of operations, the computing device can pre-charge the CCDs of a camera.

For the fourth UI element, the computing device may establish connections with one or more communication services for managing remote mute functions. For illustrative purposes, a remote mute function may involve a number of complex operations for controlling the microphone connections for participants of a communication session. In the functionality associated with the fourth UI element 120D, the computing device 101 may be required to take number of steps, e.g., establish a connection with the service managing the communication session, issue commands for muting remote participants at the server level, and then perform a number of operations to mute participants at the device level. Any number of these operations can be part of a first stage that can be initiated in response to the detection of a predetermined input gesture, e.g., a predetermined gesture input with respect to the first detection area 119A.

To continue the example of FIG. 5A, the fifth UI element can involve any number of operations for enabling a computing device to share content, e.g., share a desktop, file, or a video stream. Thus, as part of a first stage of operations, the computing device may establish a connection with a remote service storing content files. The sixth UI element can involve any number of operations for enabling a computer to close a communication session. For example, session recordings or shared content may be saved to a channel, connection statistics may be saved to memory, etc.

Figure 5C:
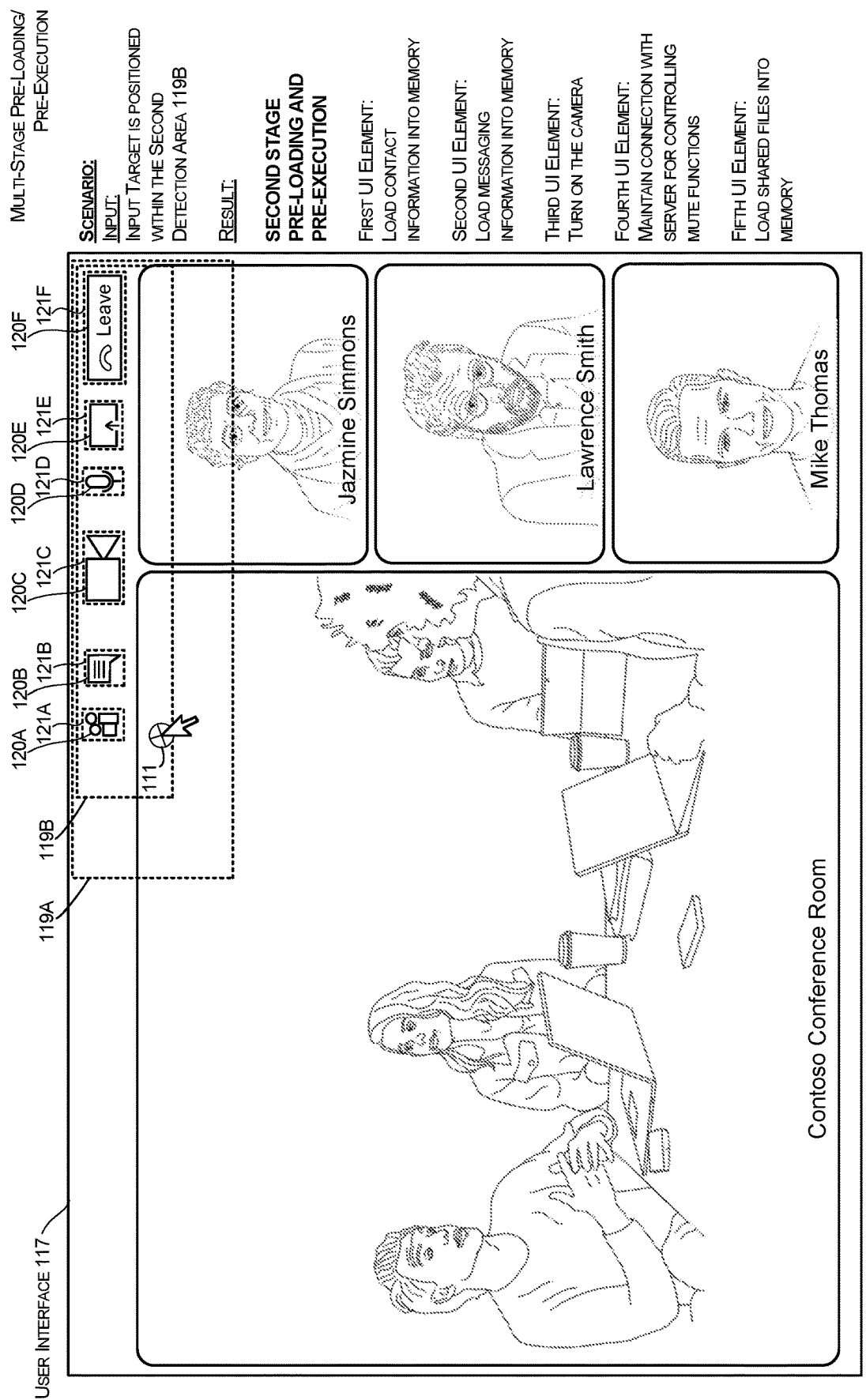
FIG. 5C shows an example user interface and a third state of an input target in a process for executing or pre-loading stages of application components.

As shown in FIG. 5C, when the input target 111 is moved into the second detection area 119B, the computing device invokes a second stage of load and/or execution operations. For example, with respect to the first UI element, the computing device may load contact information into memory. For the remaining UI elements, the computing device may respectively, load messaging information into memory, turn on a camera on, execute additional operations of a mute function, load shared content files into memory, and execute additional operations for closing a communication session.

Figure 5D:
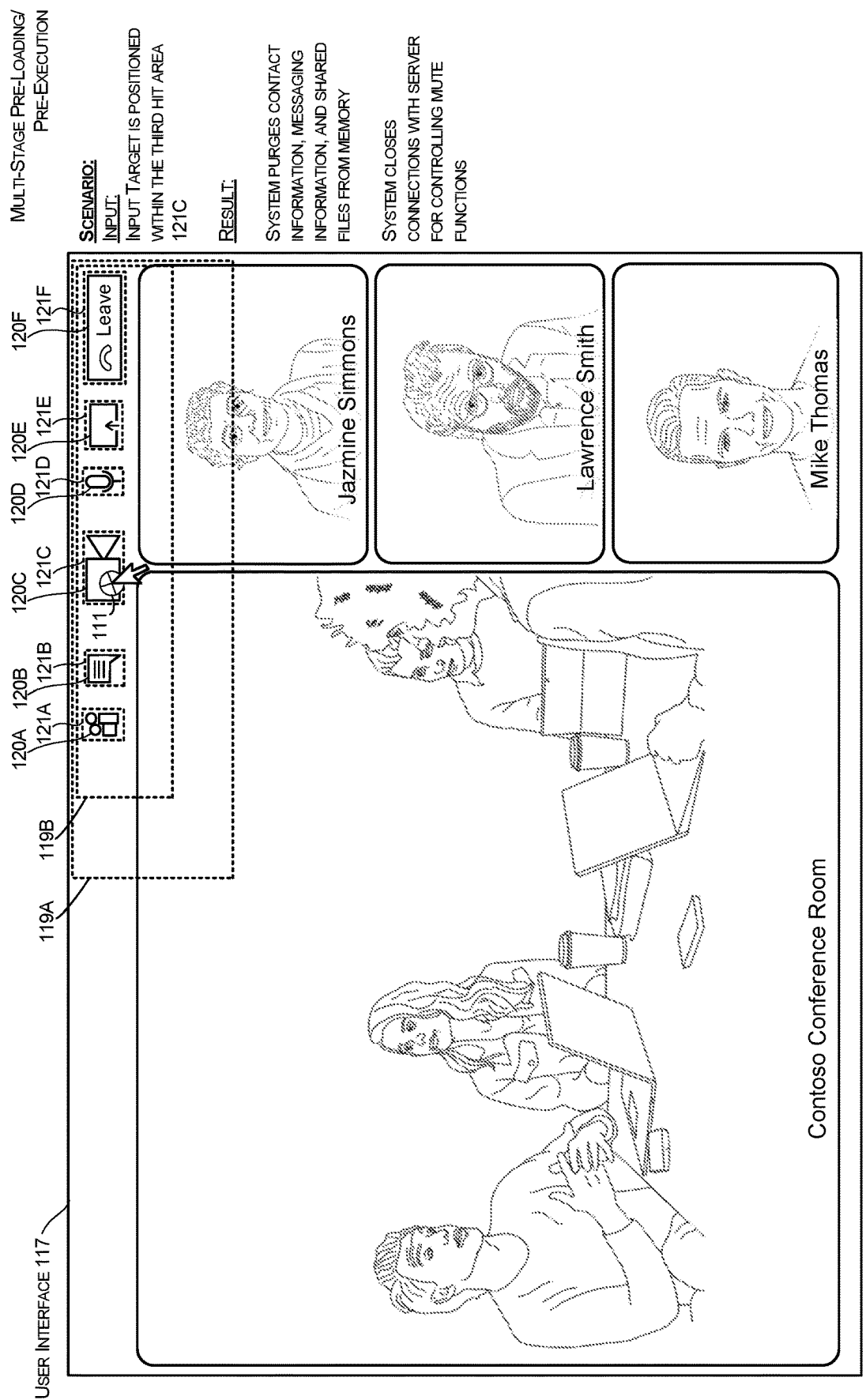
FIG. 5D shows an example user interface and a fourth state of an input target in a process for executing or pre-loading stages of application components.

Next, as shown in FIG. 5D, when the input target is moved within a particular hit area, such as the hit area for the third UI element 120C, the computing device may purge and/or cancel the execution of one or more application components. In this illustrative example, when the input target 111 moves within the hit area of the third UI element 120C, the computing device may purge the preloaded contact information, messaging information, and shared files from memory.

Figure 6A:
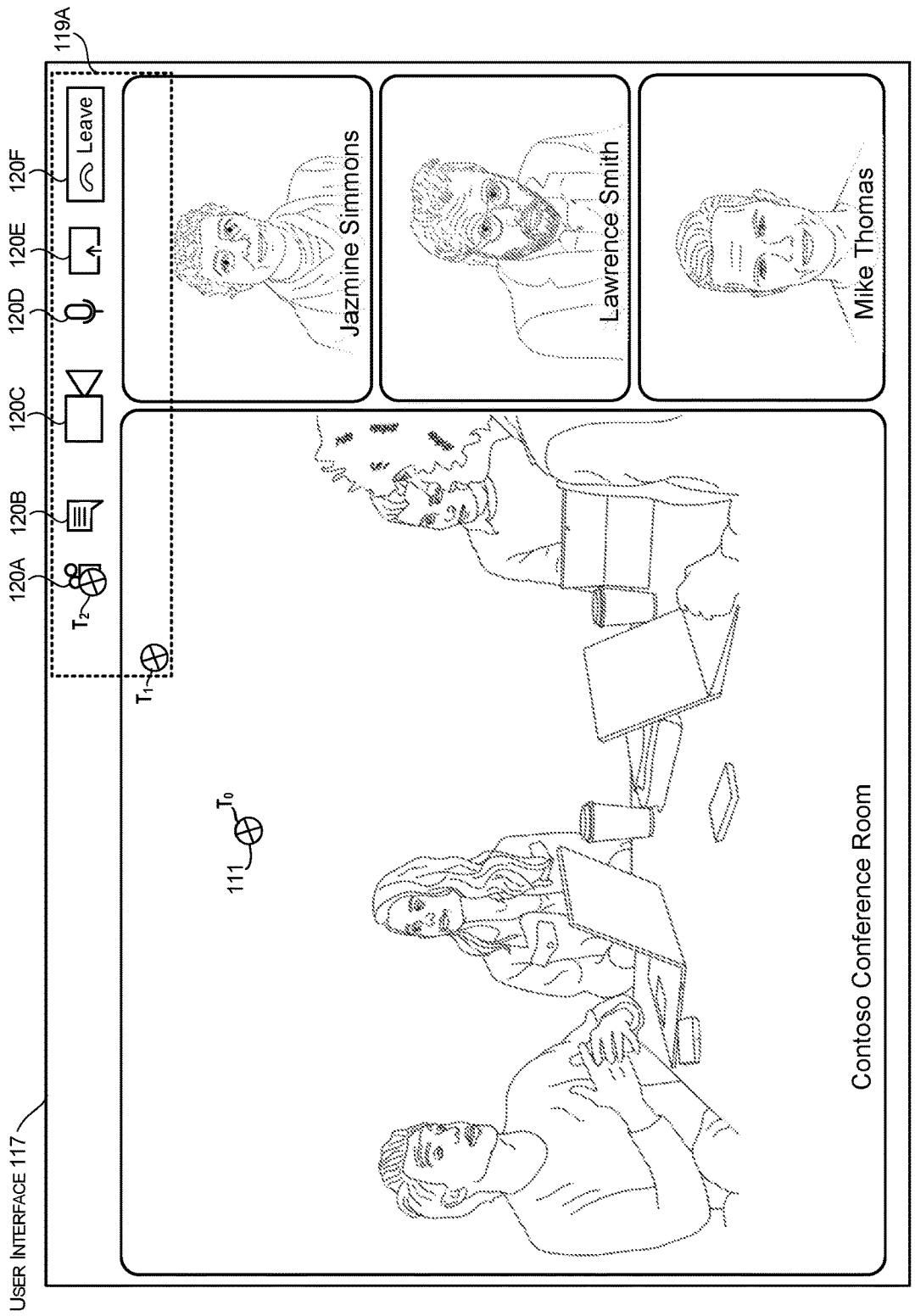
FIG. 6A shows an example user interface having multiple detection areas and a first set of states of an input target in a process for executing or pre-loading application components associated with each detection area.
Figure 6B:
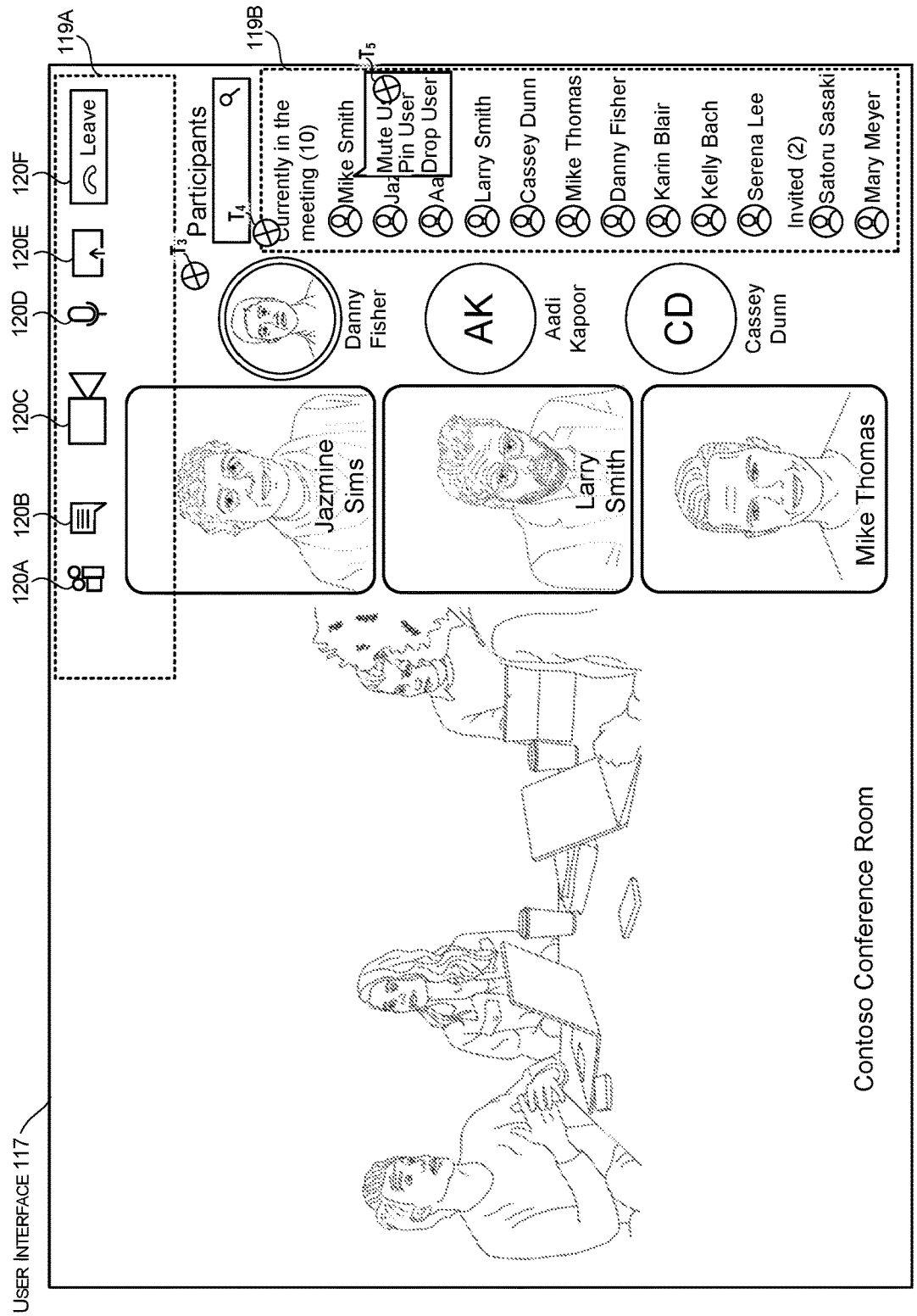
FIG. 6B shows an example user interface having multiple detection areas and a second set of states of an input target in a process for executing or pre-loading application components associated with each detection area.

Turning now to FIGS. 6A through 6C, an embodiment involving multiple detection areas is shown and described below. Generally described, this embodiment involves a user interface configuration where individual detection areas are each configured to surround separate sets of UI elements. FIG. 6A shows several states of a user input gesture in a first UI arrangement having one detection area, FIG. 6B shows additional states of a user input gesture in a second UI arrangement having two detection areas, and FIG. 6C is a chart showing different actions that can be performed in response to detecting particular input gestures with respect to each detection area.

As shown in FIG. 6A, at Time 0 ($T_0$), the input target 111 is positioned outside of the first detection area 119A. With reference to the actions shown in FIG. 6C, the computing device takes no action at Time 0 ($T_0$) based on the position of the input target 111. Next, at Time 1 ($T_1$) the input target 111 is positioned within the first detection area 119A. With reference to FIG. 6C, the computing device initiates a first stage of operations with respect to application components associated with the first detection area 119A based on the position of the input target 111. Next, at Time 2 ($T_2$) the input target 111 is positioned over the first UI element 120A during a user action, such as a mouse click, voice command or touch gesture. In response, the computing device can initiate functionality associated with the first UI element, such as displaying contact information. An example of this display is shown in FIG. 6B.

In some configurations, in response to the input target being positioned over the first UI element, the computing device can initiate one or more cancellation or purging operations for the application components associated with the remaining UI elements (120B-120F). However, as shown in FIG. 6C, the computing device is configured with a policy that instructs the computing device to take no action in cancelling the pre-loaded and pre-executed application components based on the input gesture at Time 2 ($T_2$).

Next, as shown in FIG. 6B, at Time 3 ($T_3$), the computing device tracks the movement of the input target 111 and detects that the input target 111 exits the first detection area 119A, and moves towards the second detection area 119B. In response, the computing device initiates cancellation and/or purge operations for the application components associated with the UI elements (120A-120F) of the first detection area 119A. In one illustrative example, as shown in FIG. 6C, at Time 3 ($T_3$), the computing device purges any preloaded messages information, and performs other operations which may turn off any pre-executed hardware functionality.

Next, at Time 4 ($T_4$), the computing device detects that the input target 111 enters the second detection area 119B. In response, the computing device initiates a first stage of operations with respect to application components associated with the second detection area 119B. In this example, the system can execute a number of application components to enable the "Mute," "Pin" and "Drop" functions of the communication application. As shown in FIG. 6C, at Time 4 ($T_4$), the computing device initiates a connection with a remote service configured to manage the mute function. In addition, at Time 4 ($T_4$), the computing device may retrieve contact information for a selected user to enable the pin function. Then, when the user selects the Mute UI element at Time 5 ($T_5$), the computing device can perform the mute function by sending a new command using the connection that was established at Time 4 ($T_4$). In addition, the computing device at Time 5 ($T_5$), may purge the stored contact information to free resources for other functionality.

Figure 7:
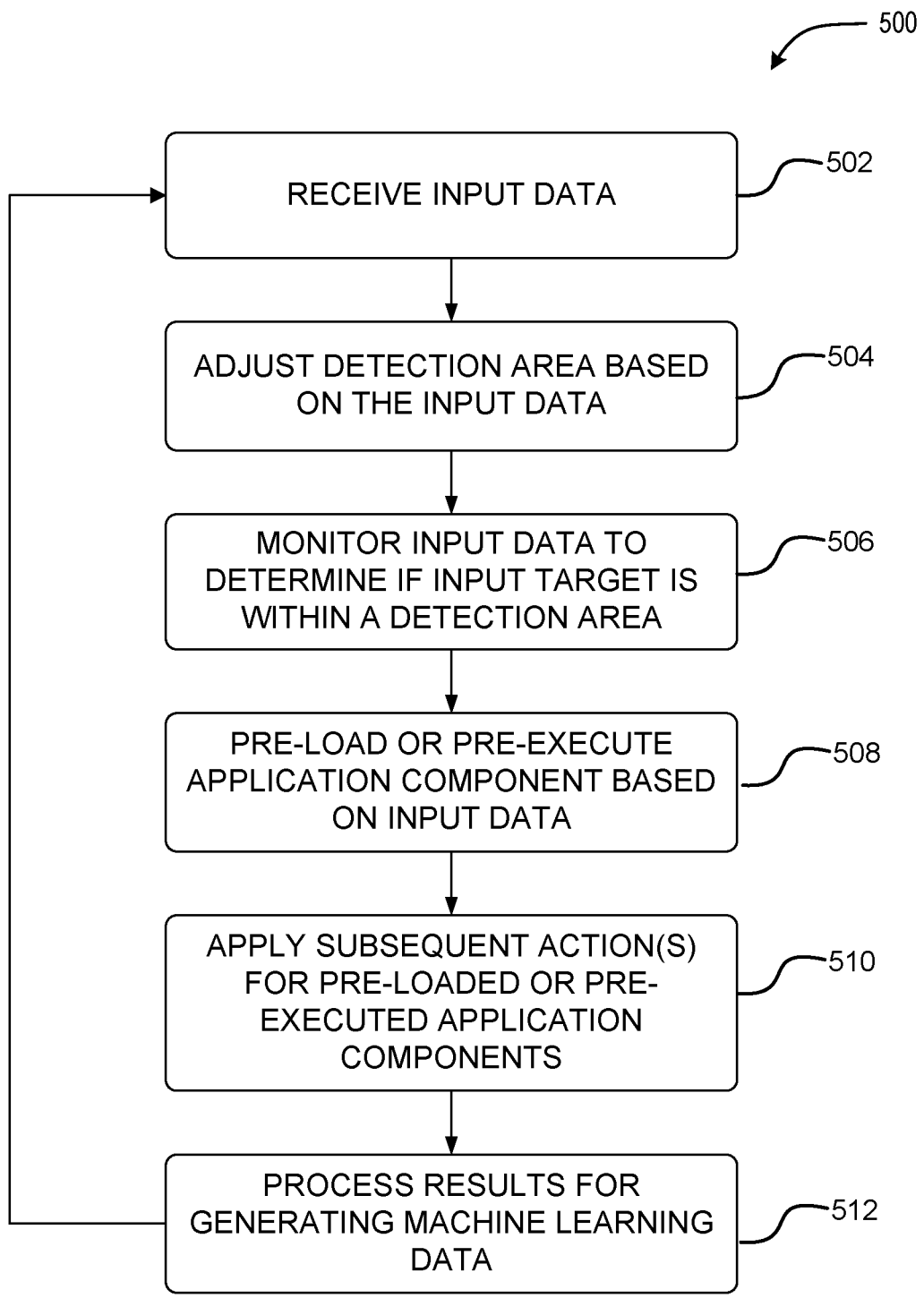
FIG. 7 is a flow diagram showing aspects of a routine for enabling the techniques disclosed herein.

Turning now to FIG. 7, aspects of a routine 500 for utilizing predictive gestures to preload and/or execute application components to provide improved responsiveness and loading times in software applications. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be rearranged, added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the predictive gesture engine 134 for performing the techniques disclosed herein, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 7, the routine 500 begins at operation 502 where the predictive gesture engine 134 receives input data 116 indicating gesture characteristics of an input target 111 on a graphical user interface 117 rendered on a display device 118. The input data 116 can be generated by any type of input device 105 for detecting and/or measuring one or more user gestures, such as, but not limited to, a pointing device 105A (e.g., a mouse, trackball, touchpad, digital pen, touch screen, etc.), a microphone 105B for receiving voice input 132, a head-mounted display (HMD) device 105C or a camera 105D for tracking a gaze gesture 131 or a hand gesture 133. The generation of input data 116 can be from any combination of input devices 105 or any single device 105. The input data 116 can be interpreted to determine the position, velocity, and direction of the input target 111. An input target 111 can be controlled by any form of user input device suitable for generating coordinates of the input target 111 within a rendering of a user interface 117.

Next, at operation 504, the predictive gesture engine 134 can adjusting at least one physical characteristic of the detection area 119 based on the input data. In some configurations, the predictive gesture engine 134 can analyze the input data 116 to determine if the gesture characteristics meet one or more criteria with respect to a detection area 119 that is positioned in proximity to one or more selectable graphical elements 120 associated with one or more application components 122. In addition, or in the alternative, the predictive gesture engine 134 can analyze one or more attributes of the one or more application components 122, such as the size or a level of complexity of one or more associated application components 122. In response to determining that the one or more attributes of the one or more application components 122 or the gesture characteristics meet the one or more criteria, the predictive gesture engine 134 can adjust at least one physical characteristic of the detection area 119, such as a size, shape, and/or position of a detection area 119.

Next, at operation 506, the predictive gesture engine 134 can monitor the input data to determine that a location of the input target 111 is within, or has moved within, the detection area 119. Although this example involves an input target 111 that is within the detection area 119, other types of predetermined relationships between the input target 111 and the detection area 119 can be used to initiate any type of preloading or pre-execution operation.

Next, at operation 508, the protective gesture engine 134 causes the computing device to 101 to load the one or more application components 122 into memory or cause the computing device 101 to execute the one or more application components 122 to improve a response time for an application utilizing the one or more application components 122. In some configurations, the application components that are preloaded or pre-executed are associated with functionality that is initiated by a selection of the selectable graphical elements 120 that are positioned within the detection area 119. In one illustrative example, the application components that are preloaded or pre-executed are to be used by functionality that is initiated by a selection of the selectable graphical elements 120 positioned within the detection area 119. In another illustrative example, application components that are preloaded or pre-executed perform one or more operations that change the state of a computing system, a network connection, or other data structures that are to be used by functionality that is initiated by a selection of the selectable graphical elements 120 positioned within the detection area 119.

Next, at operation 510, the predictive gesture engine 134 can apply subsequent actions for the preloaded or pre-executed application components. The subsequent actions can include canceling the execution of the application component. The subsequent actions can also include purging and application component from memory. The subsequent actions can be based on the detection of a predetermined gesture that indicates that the user is not likely to select a UI element that is related to functionality that is configured to utilize the canceled or purged application components.

At operation 512, the predictive gesture engine 134 can process results from one or more user inputs for generating machine learning data to be used in future iterations of the routine 500. For instance, if a user selects a particular UI element a threshold number of times, or a threshold number of times more than another UI element, operation 512 may increase or decrease a threshold distance for that particular UI element. As a result, the system may purge or cancel application components for other UI elements using adjusted distance threshold as a user increases or decreases the use of a particular UI element.

In another example, a computing device may also change the size, shape or position of a detection area if a if a user selects a particular UI element or a group of UI elements a threshold number of times. In some embodiments, the detection area can be enlarged or shrink when the system respectively detects that an associated UI element is selected a threshold number of times or is not selected a threshold number of times compared to other UI elements. This way, more commonly used functions for a particular user are more likely to be preloaded when selected. Threshold distances and threshold velocities associated with a detection area can also be increased or decreased when UI elements within the associated with a detection area are selected by a user input. Once the operation 512 is complete, the routine 500 can return to operation 502 to repeat the routine using the any adjusted thresholds, detection areas, etc.

Figure 8:
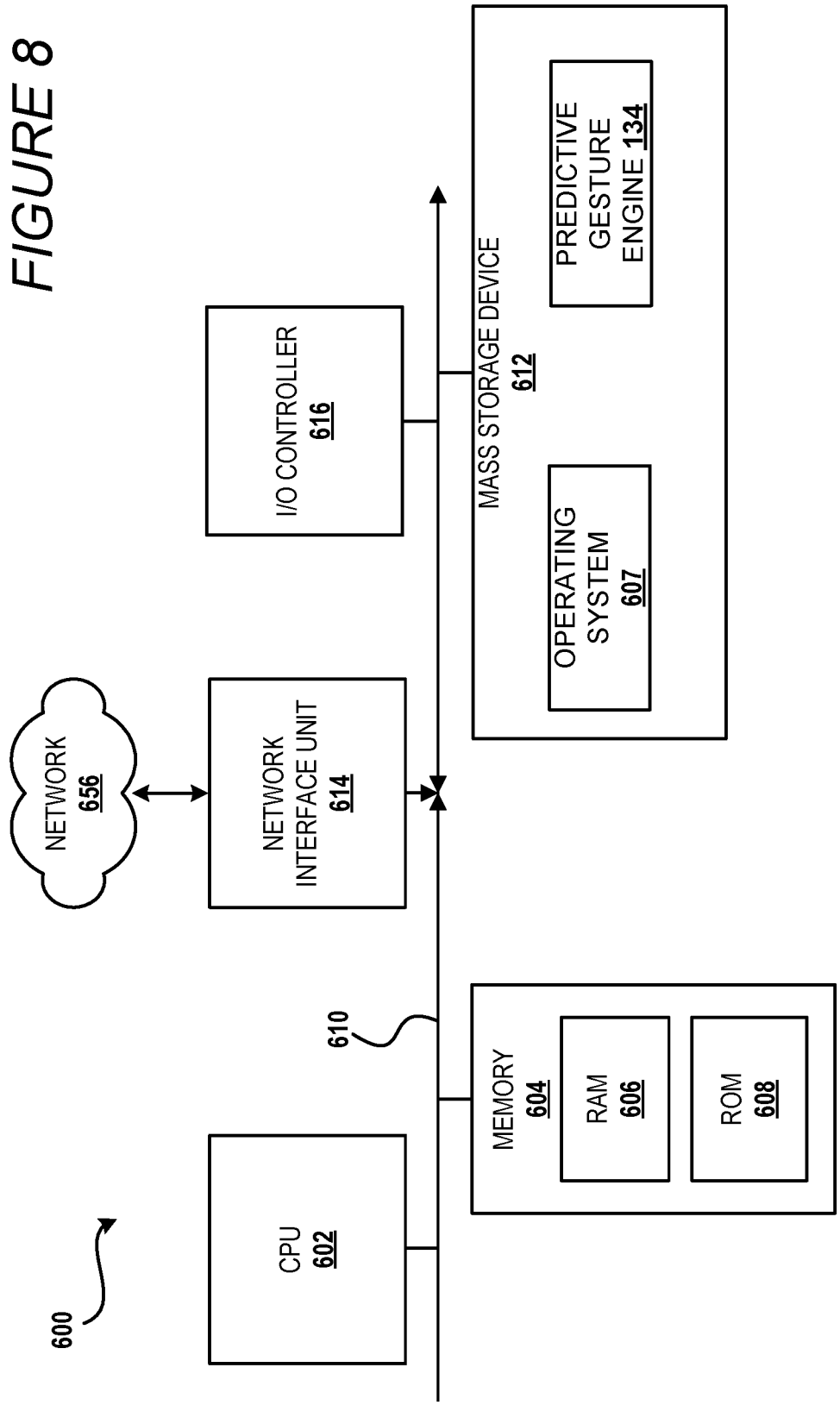
FIG. 8 is a computer architecture diagram illustrating an illustrative computer hardware and software architecture for a computing system capable of implementing aspects of the techniques and technologies presented herein.

FIG. 8 shows additional details of an example computer architecture 600 for a computer, such as the document server 120 (FIG. 1), capable of executing the program components described herein. Thus, the computer architecture 600 illustrated in FIG. 8 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 8 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more applications, such as the predictive gesture engine 134 that can perform the techniques disclosed herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 8). Similarly, the input/output controller 616 may provide output to a display screen, a printer, or other type of output device (also not shown in FIG. 8).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 8, may include other components that are not explicitly shown in FIG. 8, or may utilize an architecture completely different than that shown in FIG. 8.

Figure 9:
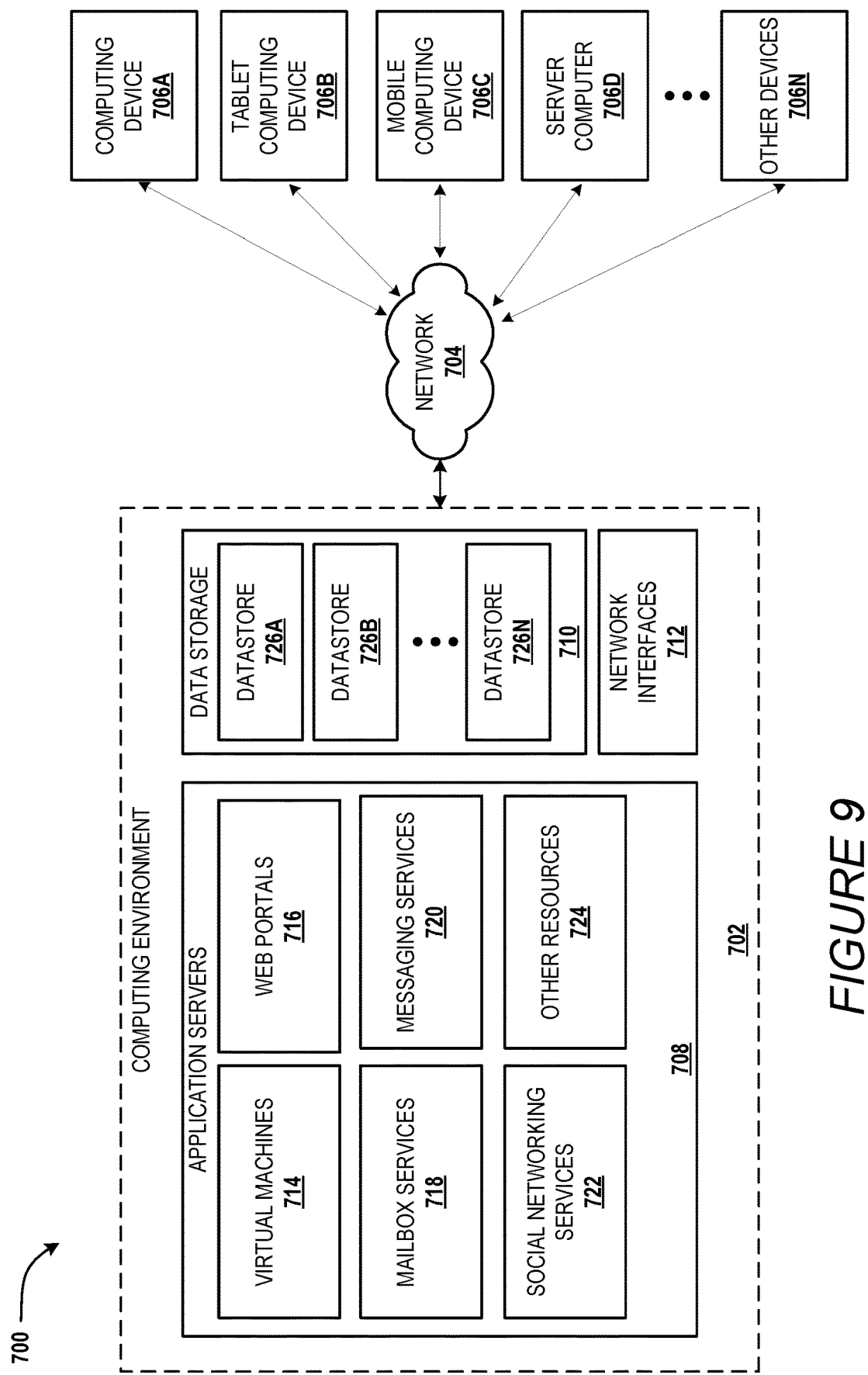
FIG. 9 is a diagram illustrating a distributed computing environment capable of implementing aspects of the techniques and technologies presented herein.

FIG. 9 depicts an illustrative distributed computing environment 700 capable of executing the software components described herein. Thus, the distributed computing environment 700 illustrated in FIG. 9 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 8. The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 9). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 5 and 7. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling efficient testing disclosed herein. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 9. Any device or service depicted herein can be used as a resource for supplemental data, including email servers, storage servers, etc.

As shown in FIG. 9, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 9, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 9.

Turning now to FIG. 10, an illustrative computing device architecture 800 for a computing device that is capable of executing various software components described herein for enabling the techniques disclosed herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in the figures. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 10 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 10, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 8. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+

"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual- multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

The disclosure presented herein also encompasses the subject matter set forth in the following clauses:

Example Clause 1: A computer-implemented method for execution on a computing device 101, the method comprising: receiving input data 116 indicating a direction or a location of an input target 111 on a graphical user interface 117 rendered on a display device 118; analyzing the input data 116 to determine if the direction of the input target 111 or the location of the input target 111 meets one or more criteria with respect to a detection area 119 that is positioned in proximity to one or more selectable graphical elements 120 associated with one or more application components 122; in response to determining that the direction of the input target 111 or the location of the input target 111 meets the one or more criteria with respect to the detection area 119, adjusting at least one dimension of the detection area 119; monitoring the input data 116 to determine that the location of the input target 111 is within the detection area 119; and in response to determining that the location of the input target 111 is within the detection area 119, causing the computing device 101 to load the one or more application components 122 into memory or causing the computing device 101 to execute the one or more application components 122 to improve a response time for an application 130 utilizing the one or more application components 122.

Example Clause 2. The computer-implemented method of clause 1, wherein the direction of the input target meets the one or more criteria with respect to the detection area when the input target is moving towards the detection area with at least a threshold velocity, and wherein adjusting the at least one dimension of the detection area comprises increasing a size of the detection area.

Example Clause 3. The computer-implemented method of clauses 1 and 2, wherein the direction of the input target or the location of the input target meets the one or more criteria with respect to the detection area when the input target is moving towards the detection area with at least a threshold velocity while the input target is further than a threshold distance from the detection area, and wherein adjusting the at least one dimension of the detection area comprises increasing a size of the detection area.

Example Clause 4. The computer-implemented method of clauses 1-3, wherein the direction of the input target or the location of the input target meets the one or more criteria with respect to the detection area when the input target is moving towards the detection area while the input target is within a threshold distance of the detection area, and wherein adjusting the at least one dimension of the detection area comprises increasing a size of the detection area.

Example Clause 5. The computer-implemented method of clauses 1-4, wherein the direction of the input target or the location of the input target meets the one or more criteria with respect to the detection area when the input target is moving towards the detection area while the input target is within a threshold distance of the detection area and while a velocity of the input target exceeds a velocity threshold, and wherein adjusting the at least one dimension of the detection area comprises increasing a size of the detection area.

Example Clause 6. The computer-implemented method of clauses 1-5, wherein the direction of the input target or the location of the input target meets the one or more criteria with respect to the detection area when the input target is moving away from the detection area while the input target is beyond a threshold distance of the detection area, and wherein adjusting the at least one dimension of the detection area comprises reducing a size of the detection area.

Example Clause 7. The computer-implemented method of clauses 1-6, further comprising: monitoring the input data to determine that the location of the input target is within a threshold distance to a first selectable graphical element of the one or more selectable graphical elements; and in response to determining that the location of the input target is within the threshold distance to the first selectable graphical element, purging at least one application component from the memory or cancelling the execution of the at least one application component, wherein the at least one application component is associated with at least one other selectable graphical element of the one or more selectable graphical elements.

Example Clause 8. The computer-implemented method of clauses 1-7 further comprising: monitoring the input data to determine that the location of the input target is within a second detection area; and in response to determining that the location of the input target is within the second detection area causing the computing device to process a second stage of the one or more application components.

Example Clause 9. The computer-implemented method of clauses 1-8, further comprising: monitoring the input data to determine that the input target has moved out of the detection area and is moving toward a second detection area; and in response to determining that the input target has moved out of the detection area and is moving toward the second detection area, purging at least one application component from the memory or cancelling the execution of the at least one application component, wherein the at least one application component is associated with the one or more selectable graphical elements.

Example Clause 10. A computing device 800 comprising: one or more processing units 802; and a computer-readable storage medium 804 having encoded thereon computer-executable instructions to cause the one or more processing units 802 to execute a method comprising, receiving input data 116 indicating gesture characteristics of an input target 111 on a graphical user interface 117 rendered on a display device 118; analyzing one or more attributes of the one or more application components 122 and the input data 116 to determine if the gesture characteristics meet one or more criteria with respect to a detection area 119 that is positioned in proximity to one or more selectable graphical elements 120 associated with one or more application components 122; in response to determining that the one or more attributes of the one or more application components 122 or the gesture characteristics meet the one or more criteria, adjusting at least one physical characteristic of the detection area 119; monitoring the input data 116 to determine that a location of the input target 111 is within the detection area 119; and in response to determining that the location of the input target 111 is within the detection area 119, causing the computing device 101 to load the one or more application components 122 into memory or causing the computing device 101 to execute the one or more application components 122 to improve a response time for an application utilizing the one or more application components 122.

Example Clause 11. The computing device of clause 10, wherein the one or more attributes of the one or more application components meet the one or more criteria when a size of the one or more application components exceeds a size threshold, wherein adjusting the at least one physical characteristic of the detection area comprises increasing a size of the detection area.

Example Clause 12. The computing device of clauses 10 and 11, wherein the one or more attributes of the one or more application components meet the one or more criteria when a complexity level of the one or more application components exceeds a complexity threshold, wherein adjusting the at least one physical characteristic of the detection area comprises increasing a size of the detection area.

Example Clause 13. The computing device of clauses 10-12, wherein the gesture characteristics meet one or more criteria when the input target is moving towards the detection area with at least a threshold velocity while the input target is further than a threshold distance from the detection area, and wherein adjusting the at least one physical characteristic of the detection area comprises increasing a size of the detection area.

Example Clause 14. The computing device of clauses 10-13, wherein the gesture characteristics meet one or more criteria when the input target is moving towards the detection area while the input target is within a threshold distance of the detection area, and wherein adjusting the at least one physical characteristic of comprises increasing a size of the detection area.

Example Clause 15. A system 800 comprising: means for receiving input data 116 indicating gesture characteristics of an input target 111 on a graphical user interface 117 rendered on a display device 118; means for analyzing one or more attributes of the one or more application components 122 and the input data 116 to determine if the gesture characteristics meet one or more criteria with respect to a detection area 119 that is positioned in proximity to one or more selectable graphical elements 120 associated with one or more application components 122; means for adjusting at least one physical characteristic of the detection area 119, in response to determining that the one or more attributes of the one or more application components 122 or the gesture characteristics meet the one or more criteria; means for monitoring the input data 116 to determine that a location of the input target 111 is within the detection area 119; and means for causing the computing device 101 to load the one or more application components 122 into memory or causing the computing device 101 to execute the one or more application components 122 to improve a response time for an application utilizing the one or more application components 122 in response to determining that the location of the input target 111 is within the detection area 119.

Example Clause 16. The system of clause 15, wherein the gesture characteristics meet the one or more criteria with respect to the detection area when the input target is moving towards the detection area while the input target is within a threshold distance of the detection area and while a velocity of the input target exceeds a velocity threshold, and wherein adjusting the at least one physical characteristic of the detection area comprises increasing a size of the detection area.

Example Clause 17. The system of clauses 15 and 16, wherein the gesture characteristics meet the one or more criteria with respect to the detection area when the input target is moving away from the detection area while the input target is beyond a threshold distance of the detection area, and wherein adjusting the at least one physical characteristic of the detection area comprises increasing a size of the detection area.

Example Clause 18. The system of clauses 15-17, further comprising: means for monitoring the input data to determine that a location of the input target is within a threshold distance to a first selectable graphical element of the one or more selectable graphical elements; and means for purging at least one application component from the memory or cancelling the execution of the at least one application component, in response to determining that the location of the input target is within the threshold distance to the first selectable graphical element, wherein the at least one application component is associated with at least one other selectable graphical element of the one or more selectable graphical elements.

Example Clause 19. The system of clauses 15-18, further comprising: means for monitoring the input data to determine that the location of the input target is within a second detection area; and means for causing the computing device to process a second stage of the one or more application components, in response to determining that the location of the input target is within the second detection area.

Example Clause 20. The system of clauses 15-19, further comprising: means for monitoring the input data to determine that the input target has moved out of the detection area and is moving toward a second detection area; and means for purging at least one application component from the memory or cancelling the execution of the at least one application component, in response to determining that the input target has moved out of the detection area and is moving toward the second detection area, wherein the at least one application component is associated with the one or more selectable graphical elements.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computer-implemented method for execution on a computing device, the method comprising:
receiving input data indicating a direction or a location of an input target on a graphical user interface rendered on a display device;
analyzing the input data to determine if the direction of the input target or the location of the input target meets one or more criteria with respect to a detection area that is positioned in proximity to one or more selectable graphical elements associated with one or more application components; in response to determining that the direction of the input target or the location of the input target meets the one or more criteria with respect to the detection area, wherein the input target meets the one or more criteria when the input target is moving towards the detection area with a velocity that is greater than a predetermined velocity while a distance between the input target and the detection area is less than a predetermined distance, enlarging the detection area by adjusting at least one dimension of the detection area that contains a hit area configured to cause execution of the one or more application components, wherein the detection area is not enlarged when the velocity of the input target is less than the predetermined velocity while the distance between the input target and the detection area is greater than the predetermined distance;
monitoring the input data to determine that the location of the input target is within the detection area; and in response to determining that the location of the input target is within the detection area that is configured to be enlarged when the input target is moving towards the detection area with the velocity that is greater than the predetermined velocity while the distance between the input target and the detection area is less than the predetermined distance, causing the computing device to load the one or more application components into memory to improve a response time for the one or more application components configured to be executed in response to the input target being positioned in the hit area.

2. The computer-implemented method of claim 1, wherein the direction of the input target meets the one or more criteria with respect to the detection area when the input target is moving towards the detection area with at least the predetermined velocity, and wherein adjusting the at least one dimension of the detection area comprises increasing a size of the detection area.

3. The computer-implemented method of claim 1, wherein the direction of the input target or the location of the input target meets the one or more criteria with respect to the detection area when the input target is moving towards the detection area with at least the predetermined velocity while the input target is further than the predetermined distance from the detection area, and wherein adjusting the at least one dimension of the detection area comprises increasing a size of the detection area.

4. The computer-implemented method of claim 1, wherein the direction of the input target or the location of the input target meets the one or more criteria with respect to the detection area when the input target is moving towards the detection area while the input target is within the predetermined distance of the detection area, and wherein adjusting the at least one dimension of the detection are comprises increasing a size of the detection area.

5. The computer-implemented method of claim 1, wherein the direction of the input target or the location of the input target meets the one or more criteria with respect to the detection area when the input target is moving away from the detection area while the input target is beyond the predetermined distance of the detection area, and wherein adjusting the at least one dimension of the detection area comprises reducing a size of the detection area.

6. The computer-implemented method of claim 1, further comprising:
monitoring the input data to determine that the location of the input target is within the predetermined distance to a first selectable graphical element of the one or more selectable graphical elements; and
in response to determining that the location of the input target is within the predetermined distance to the first selectable graphical element, purging at least one application component from the memory or cancelling the execution of the at least one application component, wherein the at least one application component is associated with at least one other selectable graphical element of the one or more selectable graphical elements.

7. The computer-implemented method of claim 1, further comprising:
monitoring the input data to determine that the location of the input target is within a second detection area; and
in response to determining that the location of the input target is within the second detection area causing the computing device to process a second stage of the one or more application components.

8. The computer-implemented method of claim 1, further comprising:
monitoring the input data to determine that the input target has moved out of the detection area and is moving toward a second detection area; and
in response to determining that the input target has moved out of the detection area and is moving toward the second detection area, purging at least one application component from the memory or cancelling the execution of the at least one application component, wherein the at least one application component is associated with the one or more selectable graphical elements.

9. A computing device comprising:
one or more processing units; and
a computer-readable storage medium having encoded thereon computer-executable instructions to cause the one or more processing units to execute a method comprising,
receiving input data indicating gesture characteristics of an input target on a graphical user interface rendered on a display device;
analyzing one or more attributes of the one or more application components and the input data to determine if the gesture characteristics of the input target meet one or more criteria with respect to a detection area that is positioned in proximity to one or more selectable graphical elements associated with one or more application components, wherein the gesture characteristics of the input target meet one or more criteria when the input target is moving towards the detection area with a velocity that is greater than a predetermined velocity while a distance between the input target and the detection area is less than a predetermined distance, wherein the gesture characteristics of the input target meet one or more criteria when the velocity of the input target is less than the predetermined velocity while the distance between the input target and the detection area is greater than the predetermined distance;

in response to determining that the one or more attributes of the one or more application components and the gesture characteristics meet the one or more criteria, wherein the gesture characteristics of the input target meets the one or more criteria when the input target is moving towards the detection area with the velocity that is greater than the predetermined velocity relative to the detection area while the distance between the input target and the detection area is less than the predetermined distance, enlarging the detection area by adjusting at least one dimension of the detection area, wherein the detection area is not enlarged when the velocity of the input target is less than the predetermined velocity while the distance between the input target and the detection area is greater than the predetermined distance;

monitoring the input data to determine that a location of the input target is within the detection area; and in response to determining that the location of the input target is within the detection area, causing the computing device to load the one or more application components into memory the one or more application components, wherein the one or more application components are configured to be executed in response to the input target being positioned in a hit area that is positioned within the detection area.

10. The computing device of claim 9, wherein the one or more attributes of the one or more application components meet the one or more criteria when a size of the one or more application components exceeds a size threshold, wherein adjusting the at least one physical characteristic of the detection area comprises increasing a size of the detection area.

11. The computing device of claim 9, wherein the one or more attributes of the one or more application components meet the one or more criteria when a complexity level of the one or more application components exceeds a complexity threshold, wherein adjusting the at least one physical characteristic of the detection area comprises increasing a size of the detection area.

12. The computing device of claim 9, wherein the gesture characteristics meet one or more criteria when the input target is moving towards the detection area with at least the predetermined velocity while the input target is further than the predetermined distance from the detection area, and wherein adjusting the at least one physical characteristic of the detection area comprises increasing a size of the detection area.

13. A system comprising:
means for receiving input data indicating gesture characteristics of an input target on a graphical user interface rendered on a display device;
means for analyzing one or more attributes of the one or more application components and the input data to determine if the gesture characteristics of the input target meet one or more criteria with respect to a detection area that is positioned in proximity to one or more selectable graphical elements associated with one or more application components;
means for adjusting at least one physical characteristic of the detection area, in response to determining that the one or more attributes of the one and more application components or the gesture characteristics of the input target meet the one or more criteria wherein the input target meets the one or more criteria when the input target is moving towards the detection area with a velocity that is greater than a predetermined velocity while a distance between the input target and the detection area is less than a predetermined distance, wherein the input target does not meet the one or more criteria when the velocity of the input target is less than the predetermined velocity while the distance between the input target and the detection area is greater than the predetermined distance;
means for monitoring the input data to determine that a location of the input target is within the detection area that is configured to be enlarged when the input target is moving towards the detection area with the velocity that is greater than the predetermined velocity while the distance between the input target and the detection area is less than the predetermined distance, wherein the detection area is configured to not be enlarged when the velocity of the input target is less than the predetermined velocity while the distance between the input target and the detection area is greater than the predetermined distance; and
means for causing the computing device to load the one or more application components into memory or causing the computing device to execute the one or more application components to improve a response time for an application utilizing the one or more application components in response to determining that the location of the input target is within the detection area.

14. The system of claim 13, wherein the gesture characteristics meet the one or more criteria with respect to the detection area when the input target is moving away from the detection area while the input target is beyond the predetermined distance of the detection area, and wherein adjusting the at least one physical characteristic of the detection area comprises increasing a size of the detection area.

15. The system of claim 13, further comprising:
means for monitoring the input data to determine that a location of the input target is within the predetermined distance to a first selectable graphical element of the one or more selectable graphical elements; and
means for purging at least one application component from the memory or cancelling the execution of the at least one application component, in response to determining that the location of the input target is within the predetermined_distance to the first selectable graphical element, wherein the at least one application component is associated with at least one other selectable graphical element of the one or more selectable graphical elements.

16. The method of claim 1, wherein the one or more criteria comprises a first criteria and a second criteria, wherein the input target meets the first criteria when the input target is moving towards the detection area with at least the predetermined velocity while the input target is within the predetermined distance from the detection area, wherein adjusting the at least one dimension of the detection area includes increasing a size of the detection area when the input target meets the first criteria, and
wherein the input meets the second criteria when the input target is moving away from the detection area while the input target is within the predetermined distance from the detection area, wherein adjusting the at least one dimension of the detection area includes maintaining the size of the detection area when the input target meets the second criteria.

17. The method of claim 1, wherein a size the detection area is increased when the input target is moving towards the detection area with the velocity that is greater or equal to a predetermined velocity while the distance between the input target and the detection area is less than or equal to the predetermined distance from the detection area, wherein the size the detection area is not increased when the distance between the input target and the detection area is greater than the predetermined distance.

* * * * *